United States Patent
Wang et al.

(10) Patent No.: US 10,454,558 B2
(45) Date of Patent: Oct. 22, 2019

(54) SPREADING METHOD, SPREADING CONTROL METHOD, AND APPARATUS THEREOF

(71) Applicant: BEIJING ZHIGU RUI TUO TECH CO., LTD., Beijing (CN)

(72) Inventors: Fanggang Wang, Beijing (CN); Guoyu Ma, Beijing (CN)

(73) Assignee: BEIJING ZHIGU TUO TECH CO., LTD., Beijing (CN)

( * ) Notice: Subject to any disclaimer, the term of this patent is extended or adjusted under 35 U.S.C. 154(b) by 47 days.

(21) Appl. No.: 15/489,489

(22) Filed: Apr. 17, 2017

(65) Prior Publication Data

US 2017/0317732 A1 Nov. 2, 2017

(30) Foreign Application Priority Data

Apr. 27, 2016 (CN) .......................... 2016 1 0274273

(51) Int. Cl.
*H04B 7/06* (2006.01)
*H04J 13/00* (2011.01)
*H04J 13/10* (2011.01)

(52) U.S. Cl.
CPC .......... *H04B 7/0678* (2013.01); *H04J 13/004* (2013.01); *H04J 13/102* (2013.01)

(58) Field of Classification Search
USPC .................. 375/146, 142, 148, 147, 260
See application file for complete search history.

(56) References Cited

U.S. PATENT DOCUMENTS

| | | | | |
|---|---|---|---|---|
| 5,903,555 A | * | 5/1999 | Wildauer | H04J 13/0022 370/342 |
| 5,966,376 A | * | 10/1999 | Rakib | H04B 1/707 348/E7.07 |
| 6,424,618 B1 | * | 7/2002 | Uesugi | H04J 13/004 370/208 |
| 7,301,983 B1 | * | 11/2007 | Horne | H04B 1/707 375/130 |

(Continued)

FOREIGN PATENT DOCUMENTS

| | | |
|---|---|---|
| CN | 1321374 A | 11/2001 |
| CN | 101002415 B | 9/2015 |
| WO | 02/11317 A1 | 2/2002 |

*Primary Examiner* — Wednel Cadeau
(74) *Attorney, Agent, or Firm* — Sheppard Mullin Richter & Hampton LLP

(57) ABSTRACT

Embodiments of the present application disclose a spreading method, a spreading control method, and apparatuses thereof. The spreading method comprises: determining a first combined spreading code to be used at least according to first information associated with spreading by using combined spreading codes, the first combined spreading code comprising N spreading codes, and N being an integer not less than 2; and spreading N data units by using the first combined spreading code, wherein the N data units comprise at least one first unit and at least one second unit, the at least one first unit comprises data to be sent, and the at least one second unit is configured to recover the at least one first unit. The methods and apparatuses of the embodiments of the present application can effectively solve the problem of insufficient number of orthogonal spreading codes by using combined spreading codes.

28 Claims, 14 Drawing Sheets

(56) References Cited

U.S. PATENT DOCUMENTS

| | | | |
|---|---|---|---|
| 2002/0122403 A1* | 9/2002 | Hashem | H04W 40/02 370/342 |
| 2003/0137957 A1 | 7/2003 | Kakura et al. | |
| 2006/0039343 A1 | 2/2006 | Anderson et al. | |
| 2011/0188478 A1* | 8/2011 | Elezabi | H04B 7/216 370/335 |

* cited by examiner

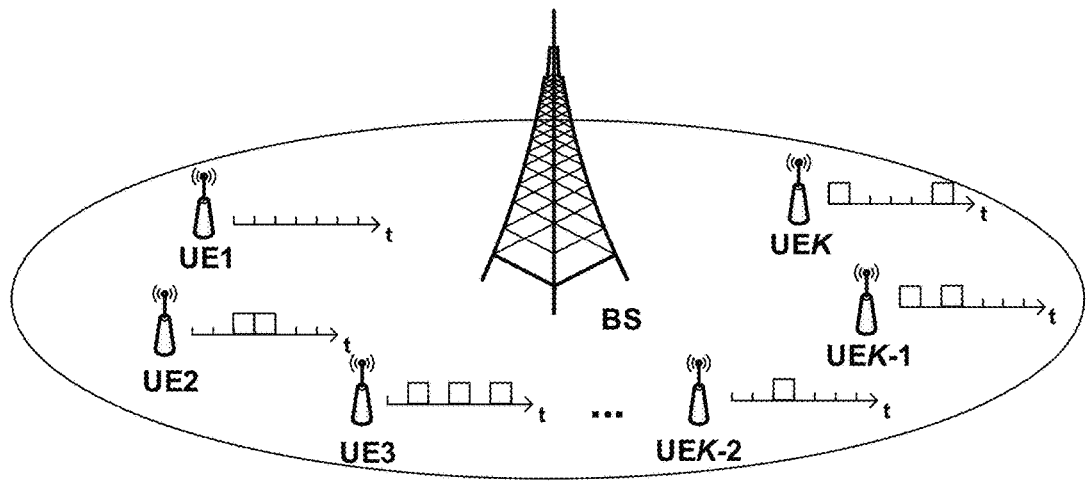
FIG. 1
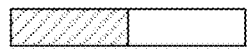
FIG. 2(a)
FIG. 2(b)
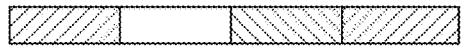
FIG. 2(c)
Determine a first combined spreading code to be used at least according to first information associated with spreading by using combined spreading codes — S320
Spread N data units by using the first combined spreading code — S340
FIG. 3(a)

SPREADING METHOD, SPREADING CONTROL METHOD, AND APPARATUS THEREOF

CROSS REFERENCE TO RELATED APPLICATION

The present application is based on and claims the benefit of priority to Chinese Application No. 201610274273.4, filed on Apr. 27, 2016, the entire contents of which are incorporated herein by reference.

Technical Field

The present application relates to the field of mobile communication technologies, and in particular, to a spreading method, a spreading control method, and apparatuses thereof.

Background

With rapid development of mobile communications in a technology level, the demand for communications in the consumer market is also promoted rapidly. The communication technology has gradually changed from technology-oriented to market-oriented. Nowadays, the mobile communication technology is to enter the age of 5G communication in 2020, the consumer market has increasingly concrete demands for future 5G communications, including higher communication speeds, wider user coverage and more accessing users. As the Internet of things, the Internet of vehicles, the Internet of bodies and other various network concepts in future have been gradually accepted, large-scale multiple access will become a normal demand of the future market. However, at present, limited time frequency resources can only bear limited user access, and thus, for future large-scale user access, the study of an overload transmission system has certain necessity and urgency. In an overload system, multiple accessing users may use the same time frequency resource through competitive random access, and then data packets of multiple users may collide at a base station receiving end. At the same time, in a future networking technology, user access is sporadic, that is, the number of packets colliding at the base station receiving end per unit time depends on the excitation probability of the accessing users to a great extent and is generally less than the total number of the accessing users. Therefore, to detect and solve collision in a sporadic overload transmission system, a combination-based spreading overload access technology comes into being.

As a whole, the sporadic overload transmission system is one form of a competitive random access system. In the system, each user randomly activates and sends a data packet in different times, and thus the data packets may probably collide at the base station receiving end. For the overload system, the higher the overload rate is, or the higher the excitation probability of each user is, the higher the probability that data packets of different users collide at the base station receiving end is, and the more the number of the colliding data packets is. As shown in FIG. 1, a cell has a single base station BS and K access user equipments UE1, UE2, . . . , UEK. Herein, suppose that the number K of the user equipments is greater than the number of time frequency resources of the system to make the system an overload system. The K users randomly activate and send data packets at different time slots within a period of time, for example, the UE 2 sends data packets at time slots 3 and 4, the UE3 sends data packets at time slots 2, 4 and 6, while the UE1 does not send data packets in a current time period; in this way, at the time slot 4, the base station may receive a superposed signal of the two users UE2 and UE3, that is, collision of data packets occurs in UE2 and UE3 at the time slot 4.

In order to try to correctly decode the colliding packets without retransmission, it is very important to distinguish the user equipments from the colliding packets. For a traditional non-overload system, the receiving end may make distinction through orthogonal resources. For example, in a Code Division Multiple Access (CDMA) system, a transmitting end uses orthogonal spreading codes (referred to as "orthogonal spreading codes" herein, and irrelevant spreading codes) to spread the sent data, and the receiving end may distinguish different user equipments through the orthogonal spreading codes. However, for the overload system, the number of the orthogonal spreading codes is evidently limited for a great number of user equipments to be accessed.

SUMMARY

In view of this, an objective of the embodiments of the present application is to provide a spreading solution in the case of an insufficient number of orthogonal spreading codes.

To achieve the foregoing objective, according to a first aspect of the embodiments of the present application, a spreading method is provided, comprising:

determining a first combined spreading code to be used at least according to first information associated with spreading by using combined spreading codes, the first combined spreading code comprising N spreading codes, and N being an integer not less than 2; and spreading N data units by using the first combined spreading code, wherein the N data units comprise at least one first unit and at least one second unit, the at least one first unit comprises data to be sent, and the at least one second unit is configured to recover the at least one first unit;

wherein the first combined spreading code is determined at least according to a spreading code codebook, the spreading code codebook comprises at least N spreading codes which comprise at least two orthogonal spreading codes and form at least M first combined spreading codes, at most one of spreading codes in corresponding positions of any two of the at least M first combined spreading codes is the same, and M is an integer not less than 2.

According to a second aspect of the embodiments of the present application, a spreading control method is provided, comprising:

generating a combined spreading code codebook at least according to a spreading code codebook; and sending first information associated with spreading by using combined spreading codes, the first information being used for determining at least one first combined spreading code;

wherein the spreading code codebook comprises at least N spreading codes which comprise at least two orthogonal spreading codes, and the N is an integer not less than 2;

the combined spreading code codebook comprises at least M first combined spreading codes comprising N spreading codes, at most one of spreading codes in corresponding positions of any two of the at least M first combined spreading codes is the same, and the M is an integer not less than 2; and the first combined spreading code is used to conduct spreading N data units which comprise at least one first unit and at least one second unit, the at least one first unit comprises data to be sent, and the at least one second unit is configured to recover the at least one first unit.

According to a third aspect of the present application, a spreading apparatus is provided, comprising:

a first determination module, configured to determine a first combined spreading code to be used at least according to first information associated with spreading by using combined spreading codes, the first combined spreading code comprising N spreading codes, and N being an integer not less than 2; and spread N data units by using the first combined spreading code, wherein the N data units comprise at least one first unit and at least one second unit, the at least one first unit comprises data to be sent, and the at least one second unit is configured to recover the at least one first unit;

wherein the first combined spreading code is determined at least according to a spreading code codebook, the spreading code codebook comprises at least N spreading codes which comprise at least two orthogonal spreading codes and form at least M first combined spreading codes, at most one of spreading codes in corresponding positions of any two of the at least M first combined spreading codes is the same, and M is an integer not less than 2.

According to a fourth aspect of the present application, a spreading control apparatus is provided, comprising:

a generation module, configured to generate a combined spreading code codebook at least according to a spreading code codebook; and a third sending module, configured to send first information associated with spreading by using combined spreading codes, the first information being used for determining at least one first combined spreading code;

wherein the spreading code codebook comprises at least N spreading codes which comprise at least two orthogonal spreading codes, and the N is an integer not less than 2;

the combined spreading code codebook comprises at least M first combined spreading codes comprising N spreading codes, at most one of spreading codes in corresponding positions of any two of the at least M first combined spreading codes is the same, and the M is an integer not less than 2; and the first combined spreading code is used to conduct spreading N data units which comprise at least one first unit and at least one second unit, the at least one first unit comprises data to be sent, and the at least one second unit is configured to recover the at least one first unit.

According to a fifth aspect of the present application, a spreading apparatus is provided, comprising:

a transceiver;

a memory, configured to store instructions; and a processor, configured to execute the instructions stored by the memory, the instructions causing the processor to perform the following steps:

determining a first combined spreading code to be used at least according to first information associated with spreading by using combined spreading codes, the first combined spreading code comprising N spreading codes, and N being an integer not less than 2; and spreading N data units by using the first combined spreading code, wherein the N data units comprise at least one first unit and at least one second unit, the at least one first unit comprises data to be sent, and the at least one second unit is configured to recover the at least one first unit;

wherein the first combined spreading code is determined at least according to a spreading code codebook, the spreading code codebook comprises at least N spreading codes which comprise at least two orthogonal spreading codes and form at least M first combined spreading codes, at most one of spreading codes in corresponding positions of any two of the at least M first combined spreading codes is the same, and M is an integer not less than 2.

According to a sixth aspect of the present application, a spreading control apparatus is provided, comprising:

a transceiver;

a memory, configured to store instructions; and a processor, configured to execute the instructions stored by the memory, the instructions causing the processor to perform the following steps:

generating a combined spreading code codebook at least according to a spreading code codebook; and sending first information associated with spreading by using combined spreading codes through the transceiver, the first information being used for determining at least one first combined spreading code;

wherein the spreading code codebook comprises at least N spreading codes which comprise at least two orthogonal spreading codes, and the N is an integer not less than 2;

the combined spreading code codebook comprises at least M first combined spreading codes comprising N spreading codes, at most one of spreading codes in corresponding positions of any two of the at least M first combined spreading codes is the same, and the M is an integer not less than 2; and the first combined spreading code is used to conduct spreading N data units which comprise at least one first unit and at least one second unit, the at least one first unit comprises data to be sent, and the at least one second unit is configured to recover the at least one first unit.

The methods and apparatuses of the embodiments of the present application can effectively solve the problem of insufficient number of orthogonal spreading codes by using combined spreading codes.

BRIEF DESCRIPTION OF THE DRAWINGS

FIG. 1 is an exemplary schematic diagram of an application scenario of each embodiment of the present application;

FIG. 2(a) to FIG. 2(c) are three exemplary structural diagrams of a combined spreading code according to an embodiment of the present application;

FIG. 3(a) is an exemplary flowchart of a spreading method according to an embodiment of the present application;

DETAILED DESCRIPTION

Figure 3B:
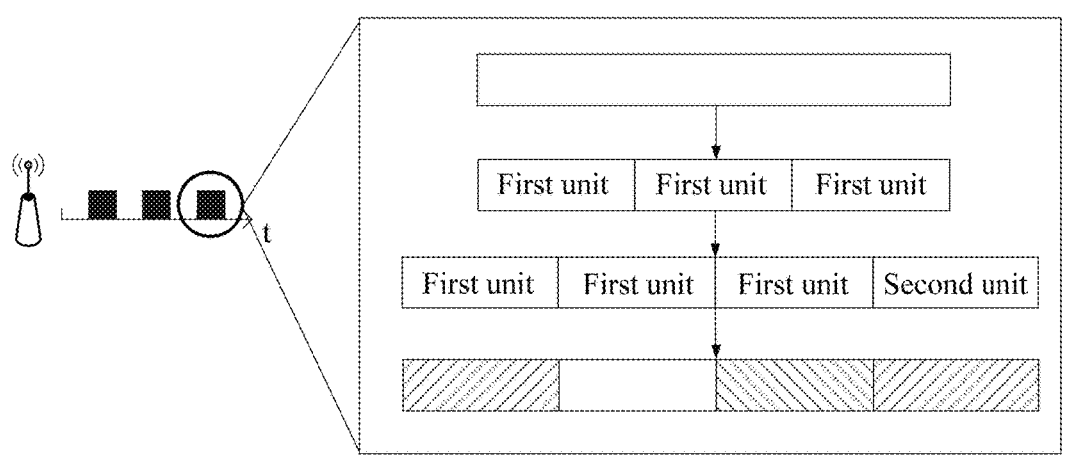
FIG. 3(b) is an exemplary schematic composition diagram of a predetermined data transmission unit.

Specific implementation manners of the present application are further described below in detail with reference to the accompanying drawings and embodiments. The following embodiments are used for describing the present application, but are not intended to limit the scope of the present application.

Those skilled in the art may understand that the terms such as "first" and "second" in the present application are used only to differentiate different devices, modules, parameters or the like, and neither represent any specific technical meaning, nor indicate any necessary logical relationship between the terms.

In the embodiments of the present application, the terms "system" and "network" are often used interchangeably. The term "combined spreading code" generally refers to a spreading code combined by at least two spreading codes, wherein a combined manner comprises, for example, series connection. As shown in FIG. 2(a), a combined spreading code formed by two spreading codes connected in series is illustrated; as shown in FIG. 2(b), a combined spreading code formed by three spreading codes connected in series is illustrated; as shown in FIG. 2(c), a combined spreading code formed by four spreading codes connected in series is illustrated; and in FIG. 2(a) to FIG. 2(c), different fillers indicate different but orthogonal spreading codes, from which it can be seen that one combined spreading code may comprise at least one kind of spreading codes, but different spreading codes are orthogonal spreading codes when the spreading codes forming the same combined spreading code comprise different spreading codes. As shown in FIG. 2(a), the combined spreading code is formed by two kinds of orthogonal spreading codes; as shown in FIG. 2(b), the combined spreading code is formed by one kind of spreading codes; as shown in FIG. 2(c), the combined spreading code is formed by three kinds of orthogonal spreading codes.

The method of each embodiment of the present application provides a spreading mechanism that solves the problem of an insufficient number of orthogonal spreading codes by using a combined spreading code formed by a limited number of orthogonal spreading codes in a combined way. FIG. 3(a) is an exemplary flowchart of a spreading method according to an embodiment of the present application, and the method may be performed by any transmitting end device. As shown in FIG. 3(a), the method comprises:

S320. Determine a first combined spreading code to be used at least according to first information associated with spreading by using combined spreading codes, the first combined spreading code comprising N spreading codes, and N being an integer not less than 2.

In the method of this embodiment, the first combined spreading code is a combined spreading code in a possible composition form, and according to different objectives to be achieved by using the combined spreading code, combined spreading codes in other possible composition forms may be used, for example, N has different values. The first information refers to any information that can be used for indicating that the combined spreading code should be used to conduct spreading and/or how to determine the first combined spreading code to be used; such information comprises, but is not limited to, a control instruction for indicating that combined spreading codes should be used to conduct spreading, information directly indicating the first combined spreading code that should be used, information for indicating how the first combined spreading code should be determined, or any other information associated with spreading by using combined spreading codes. The first combined spreading code is determined at least according to a spreading code codebook, the spreading code codebook comprises at least N spreading codes which comprise at least two orthogonal spreading codes (preferably, the number of the at least two orthogonal spreading codes is equal to the number of system available orthogonal spreading codes) and form at least M first combined spreading codes, and in order to be capable of detecting colliding users using the first combined spreading code to conduct spreading, at most one of spreading codes in corresponding positions of any two of the at least M first combined spreading codes is the same; different spreading codes are orthogonal spreading codes when the spreading codes forming the same first combined spreading code comprise different spreading codes, wherein M is an integer not less than 2. Thus, when any two users using the first combined spreading code to conduct spreading collide, at most only one data unit cannot be correctly recovered by the receiver, and preferably, M is an integer not less than the number of system available orthogonal spreading codes.

For example, in the application scenario of the overload system shown in FIG. 1, when the number of users needing to use orthogonal spreading codes to conduct spreading and even reaches or exceeds the number of available orthogonal spreading codes, the combined spreading code can be used to conduct spreading.

S340. Spread N data units by using the first combined spreading code, wherein the N data units comprise at least one first unit and at least one second unit, the at least one first unit comprises data to be sent, and the at least one second unit is configured to recover the at least one first unit.

Due to presence of the at least one second unit, when any two users using the first combined spreading code to conduct spreading collide and at most only one date unit cannot be correctly recovered by the receiver, the at least one second unit can be used to correctly recover data of the at most one unit.

To sum up, the method of this embodiment can effectively solve the problem of insufficient number of orthogonal spreading codes by using combined spreading codes.

In the method of the embodiments of the present application, the data to be sent may refer to original data, and may also refer to data obtained through channel encoding, rate matching, modulation or any other pre-processing prior to sending, that is, such data is spread by using the method of the embodiments of the present application. In order to enable the receiver to correctly recover the data in the case of possible collision, the method of the embodiments of the present application may send data at least with a predetermined data transmission unit, the predetermined data transmission unit comprises N data units, and each data unit correspondingly forms one spreading code of the first combined spreading code, that is, the spreading codes of the first combined spreading code are used to spread the corresponding data units. In this case, the method of this embodiment further comprises:

S360. Send data spread at least with the first combined spreading code by at least taking a predetermined data transmission unit as the unit.

The predetermined data transmission unit may have a length of data that should be spread with one orthogonal spreading code, and may also have any other lengths meeting a transmission demand. It should be noted that the term "recover" refers to obtaining original data through a process such as demodulation and decoding corresponding to the above pre-processing process. The at least one second unit is sufficiently configured to recover any data of the at least one first unit. In one possible implementation manner, the N data units comprise at least one first unit and a second unit, and the second unit is a function of data comprised in the at least one first unit. As shown in FIG. 3($b$), by taking N=4 as an example, a predetermined data transmission unit of data to be sent is divided into N−1=3 parts, that is, three first units, an exclusive OR value (module-2 sum) of data of the three first units is taken as a redundancy unit, that is, a second unit, and each data unit respectively corresponds to one spreading code of the first combined spreading code, which forms a predetermined data transmission unit of spreading code after spreading. According to the forming rule of the second unit, no matter which segment of the data of the four units is not correctly recovered, the data can be recovered with other three segments of data. The forming rule of the second unit may be known to both the sender and the receiver, or obtained dynamically in a communication process. After FIG. 3($b$) illustrates that the second unit is placed behind the third first unit, it may also be placed in other positions, for example, between any two first units, which does not limit the embodiments of the present application herein.

It should also be noted that the value of N is related to the length D of the data to be transmitted, and preferably, N does not exceed a spreading factor s of the system. The data to be transmitted may be divided into L−[D/s] data units, every N data units form a predetermined data transmission unit, if D/s is not an integer, data that cannot form a data unit may be allowed to form a data transmission unit which comprises less than N data units. As shown in FIG. 3($c$), the data to be transmitted may be divided into L=[D/s] data units, the spreading factor s of the system is 4, every N=4 data units form a predetermined data transmission unit, but the last transmission unit comprises N'=3 data units.

As stated above, the first information may be any information associated with spreading by using combined spreading codes. In one possible implementation manner, the first information comprises: the first combined spreading code. In such an implementation manner, the transmitting end device may directly obtain the first combined spreading code to be used according to the first information. For example, the transmitting end device may be user equipments, and the base station may allocate the first combined spreading code to be used to at least some of the user equipments. The base station may allocate a first combined spreading code corresponding to a user equipment to the user equipment in any suitable manner, and the allocation manner does not limit the embodiments of the present application. Such an allocation manner comprises, but is not limited to, random allocation, the base station may randomly allocate a certain number of first combined spreading codes to a corresponding number of user equipments connected with the base station, at a certain time, some of the user equipments have been activated to send data, while some are in silence and do not transmit data; for allocation according to channel states of the user equipments, the user equipments in the same or similar channel states are grouped, spreading codes in corresponding positions of the first combined spreading codes allocated to any two user equipments in one group are all orthogonal, so as to try to ensure reduction of the Near-Far Effect when multiple users in one group send data; for allocation according to service states of the user equipments, the user equipments of the same or similar service type are grouped, spreading codes in corresponding positions of the first combined spreading codes allocated to any two user equipments in one group are all orthogonal, in such a service, for example, under a forest fire danger sensor network, two sensors A and B transmit wind directions and humidity conditions of a certain plane respectively, and the services involved are both related to the probability reflecting occurrence of fire of the place; therefore, the possibility that the sensors A and B conduct transmission at the same time is greater, and thus the sensors A and B are grouped to use the first combined spreading codes completely orthogonal to each other.

It should be noted that allocation of the first combined spreading codes may be conducted at the beginning of access to the base station and may also be conducted in real time, but the receiving end device has to know a corresponding relationship between the first combined spreading codes and the user equipments; when the receiving end device is not the base station, it may be known by acquiring an allocation rule from the base station or directly acquiring the corresponding relationship.

In another possible implementation manner, the first information comprises: index information corresponding to N spreading codes corresponding to the N data units. In such an implementation manner, the transmitting end device can have the spreading code codebook, and spreading codes in the spreading code codebook has corresponding indexes; the first combined spreading code to be used may be determined according to the index information and the spreading code codebook. That is, step S320 further comprises:

S322. At least according to the index information, determine the first combined spreading code according to the spreading code codebook.

It should be noted that the spreading code codebook may be known to each transmitting end device, and may also be dynamically acquired in a communication process, for example, the user equipments acquire the spreading code codebook from a base station. In this case, the method of this embodiment may further comprise:

S312. Acquire second information associated with the spreading code codebook, the second information being used for determining the spreading code codebook.

Moreover, in such an implementation manner, it is still the base station that allocates the first combined spreading code to be used to at least part of the user equipments, but the allocation is notified to the user equipments through corresponding index information.

In another possible implementation manner, the first information comprises: a control instruction of using combined spreading codes to conduct spreading. In such an implementation manner, step S320 may further comprise:

S324. Determine the first combined spreading code in response to receipt of the control instruction.

The control instruction may be sent from a receiving end device to a transmitting end device, for example, a base station determines that the number of users needing to use orthogonal spreading code to conduct spreading in a current system exceeds the number of available orthogonal spreading codes according to global information, and as a response, sends the control instruction. The first information may further comprise: third information for indicating the N. In this case, in step S324, the N orthogonal spreading codes forming the first combined spreading code are directly selected, for example, randomly selected, from the spreading code codebook at least according to the third information.

In addition, in step S320, it is possible to generate a combined spreading code codebook according to the spreading code codebook and then determine the first combined spreading code to be used according to the combined spreading code codebook. Specifically, step S320 may further comprise:

S326. Generate a combined spreading code codebook at least according to the first information.

S328. Determine the first combined spreading code at least according to the combined spreading code codebook.

The combined spreading code codebook comprises at least M first combined spreading codes formed by the at least N spreading codes, and meets: at most one of spreading codes in corresponding positions of any two of the at least M first combined spreading codes is the same; different spreading codes are orthogonal spreading codes when the spreading codes forming the same first combined spreading code comprise different spreading codes, wherein M is an integer not less than 2.

In step S326, the combined spreading code codebook C may be generated in various suitable manners, only if $\forall c_i, c_j C$ and $O(c_i, c_j) \leq 1$, wherein $O(c_i, c_j)$ refers to the overlapping number of the combined spreading codes $c_i$ and $c_j$, that is, the number of identical spreading codes in the corresponding positions.

Two possible methods of generating a combined spreading code codebook are described below, but the present application is not limited thereto.

Method (I)

Figure 3C:
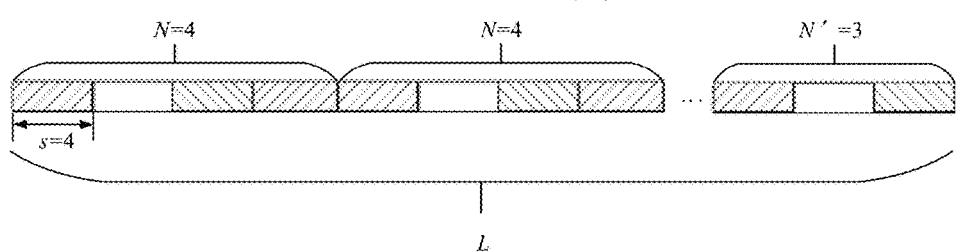
FIG. 3(c) is an exemplary schematic diagram showing that data is divided into multiple data units.
Figure 3D:
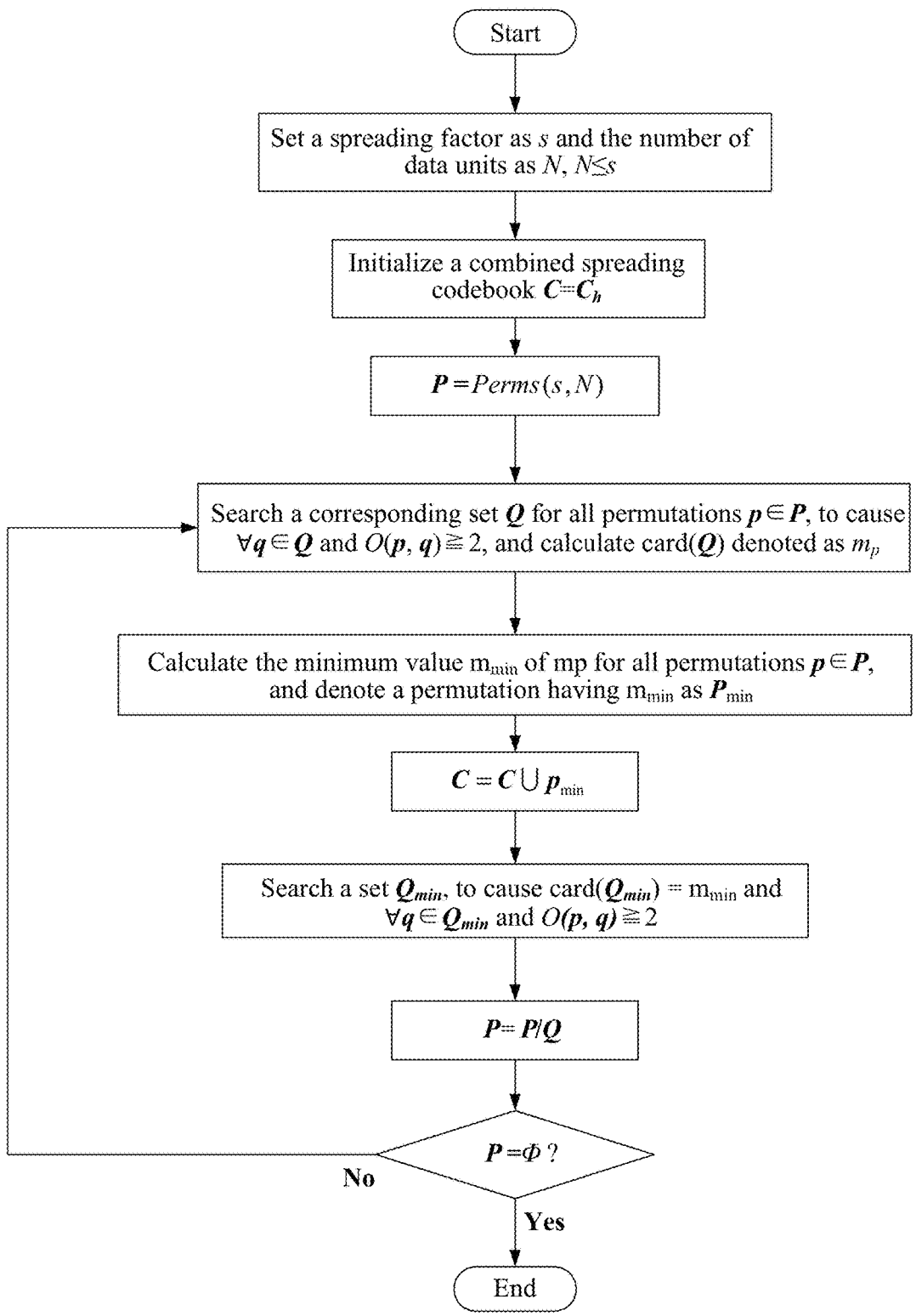
FIG. 3(d) is a flowchart of one possible method for generating a combined spreading code codebook.
Figure 3E:
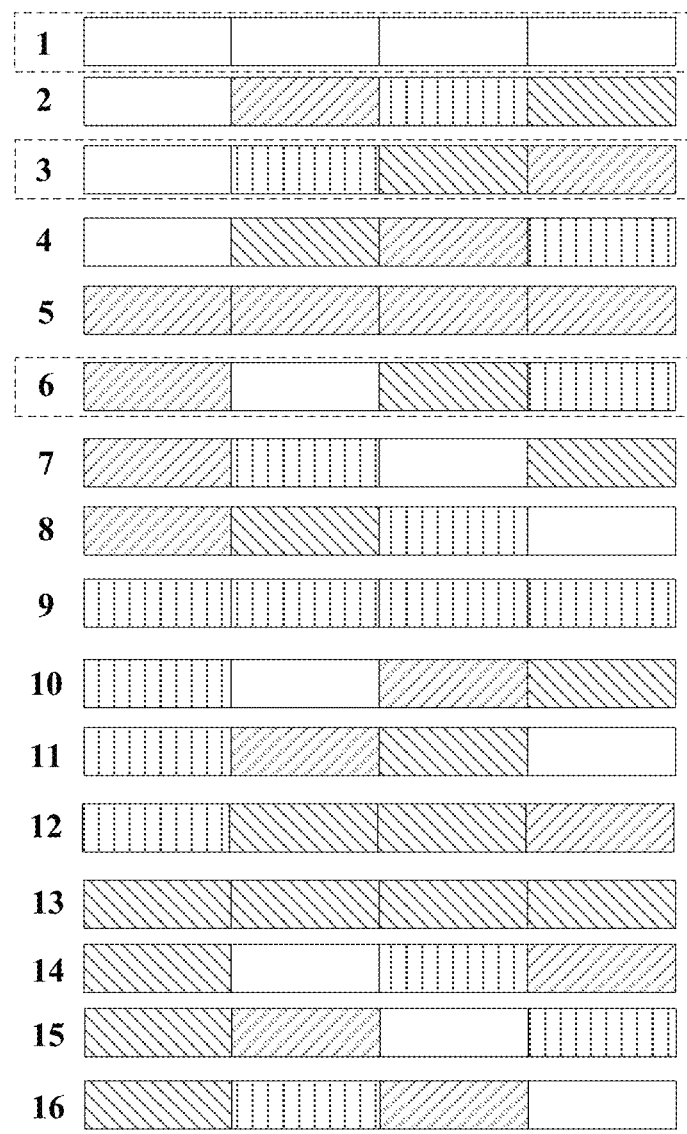
FIG. 3(e) is a schematic diagram of one possible combined spreading code codebook.

As shown in FIG. 3(d), the spreading factor s of the system and the number N of the data units are taken as inputs, and $N \leq s$. During initialization, a homogeneous combined spreading code set $C_h$ is in an initial state of a codebook set C; herein, the homogeneous combined spreading code refers to that N data units comprised in the predetermined transmission unit are spread by one kind of spreading codes, for example, first and fourth combined spreading codes in FIG. 3(e) are all homogeneous combined spreading codes; therefore, there may be a total of s homogeneous combined spreading codes for a given spreading factor s, and then the initial codebook has s combined spreading codes. After the initialization, N of the s orthogonal spreading codes are arranged, and a permutation set P=Perms(s, N) can be obtained, which becomes a parent set. Then, a corresponding combined spreading code subset Q is searched for all the combined spreading codes p in the parent set P, so that the overlapping number of any combined spreading codes q and p in Q is greater than or equal to 2, that is, $O(p, q) \geq 2$, and the subset Q is also referred to as an overlapping subset. After the corresponding overlapping subset Q is found for each p□P, the number of combined spreading codes that it has is calculated, that is, card(Q), denoted as $m_p$. Then, p having the minimum $m_p$ is searched for all the combined spreading codes p□P, which is denoted as $p_{min}$, and the minimum value thereof is also denoted as $m_{min}$. Then, the $p_{min}$ having the minimum value $m_{min}$ may be used as a reasonable combined spreading code of the combined spreading code codebook set, and thus may be added to the combined spreading code codebook set C. Then, it is necessary to search a corresponding overlapping subset $Q_{min}$ for the selected combined spreading code $p_{min}$ and delete it from the parent set P. The process is repeated so until the parent set P is null, and then the process ends. It should be noted that the method is a method of exclusion performed based on a combined spreading code codebook generation rule, and the obtained combined spreading code codebook is reasonable but incomplete.

Method (II)

Figure 3F:
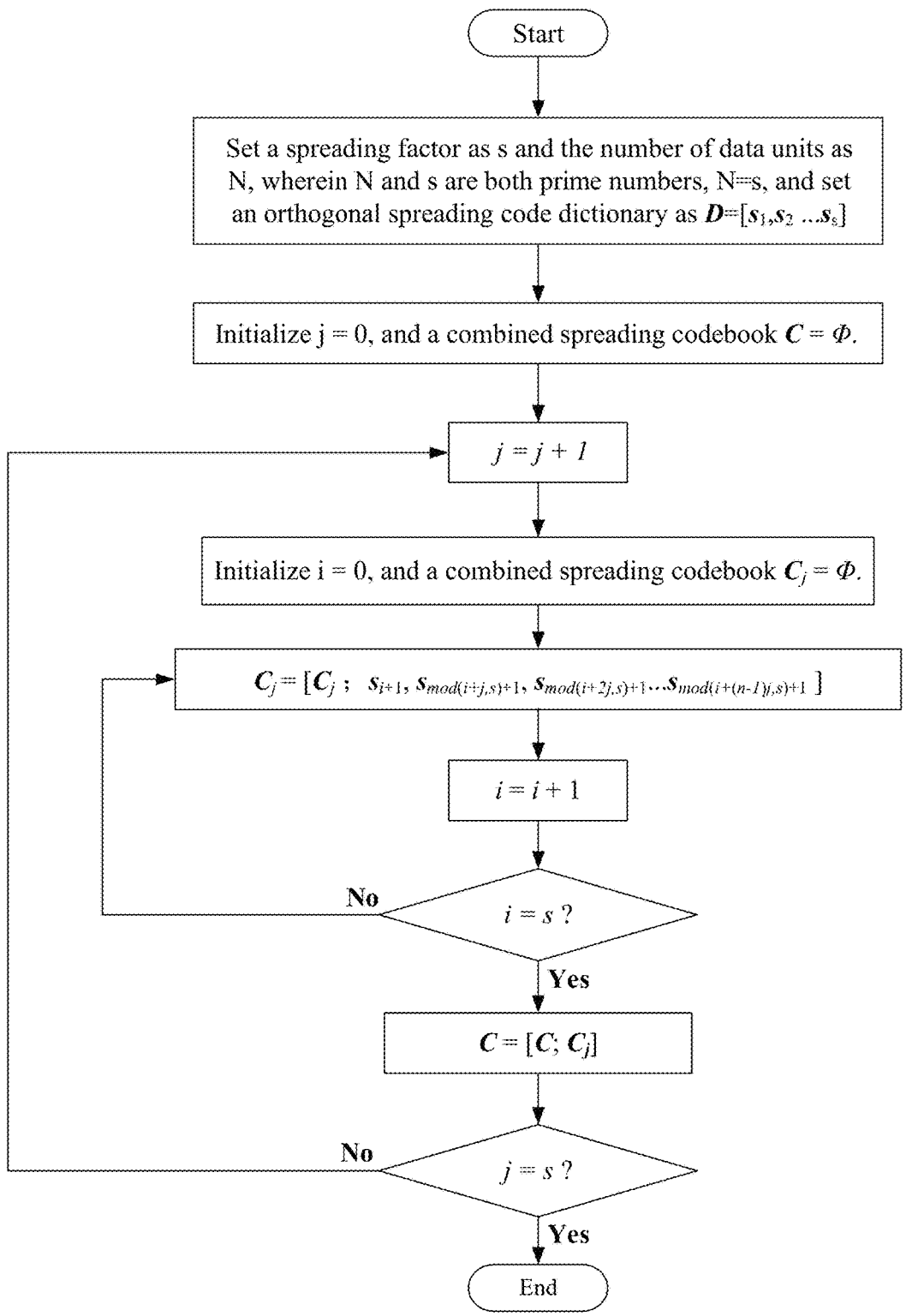
FIG. 3(f) is a flowchart of another possible method for generating a combined spreading code codebook.
Figure 3G:
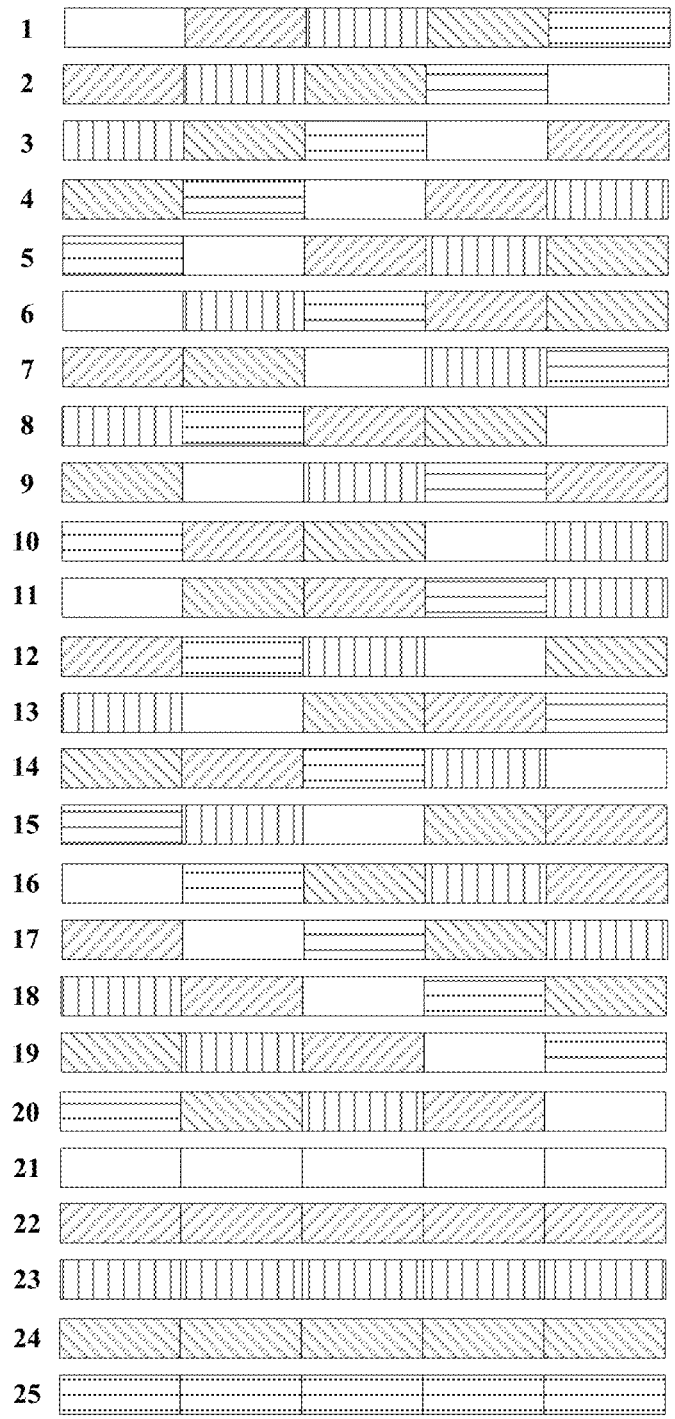
FIG. 3(g) is a schematic diagram of another possible combined spreading code codebook.

The present application further provides another combined spreading code codebook generation algorithm, called an extended cyclic shift method. As shown in FIG. 3(f), the method requires the number of available orthogonal spreading codes in the system to be equal to the number of data units in a predetermined transmission unit, that is, N=s, s is required to be a prime, $s^2$ combined spreading codes may be generated, and in each data unit of the $s^2$ combined spreading codes, s orthogonal spreading cods are all repeated s times; in FIG. 3(f), an orthogonal spreading code dictionary is a set of system available orthogonal spreading codes. FIG. 3(g) is an example of five orthogonal spreading codes generated so (s=5), at first, the five orthogonal spreading codes $[s_1,s_2,s_3,s_4,s_5]$ are shifted one spreading code to the left, five combined spreading codes are generated in the first group, then the second group of combined spreading codes are generated by cyclically arranging the first group of combined spreading codes at an interval of 1 bit, that is, $[s_1,s_3,s_5,s_2,s_4]$, $[s_2,s_4,s_1,s_3,s_5]$, $[s_3,s_5,s_2,s_4,s_1]$, $[s_4,s_1,s_3,s_5,s_2]$ and $[s_5,s_2,s_4,s_1,s_3]$, then the third group of combined spreading codes are generated by cyclically arranging the first group of combined spreading codes at an interval of 2 bits, until the fifth group of combined spreading codes are generated by cyclically arranging the first group of combined spreading codes at an interval of 4 bits, that is, $[s_1,s_1,s_1,s_1,s_1]$, $[s_2,s_2,s_2,s_2,s_2]$, $[s_3,s_3,s_3,s_3,s_3]$, $[s_4,s_4,s_4,s_4,s_4]$ and $[s_5,s_5,s_5,s_5,s_5]$.

After the combined spreading code codebook is generated, in step S328, it is feasible to arbitrarily (e.g., randomly) select one first combined spreading code from the combined spreading code codebook as the first combined spreading code to be used. However, it should be noted that, no matter which method is used to generate such a codebook, in such an implementation manner, for a system, all the transmitting end devices should generate identical combined spreading code codebooks, and in order to enable receiving end devices to correctly recover data, it is necessary to notify the receiving end devices of information associated with the combined spreading code codebook, for example, a base station. Correspondingly, the method of this embodiment further comprises:

S316. Send fourth information associated with the determined first combined spreading code, the fourth information being used for determining first combined spreading codes used by transmitting end devices. For example, the fourth information may be the first combined spreading codes per se, may be the combined spreading code codebook per se and indexes of the corresponding first combined spreading codes, may also be other information associated with how to generate the combined spreading code codebook and indexes of the corresponding first combined spreading codes, and so on.

How the receiving end devices detect collision and recover data according to the method of this embodiment is described below through specific examples.

Figure 3H:
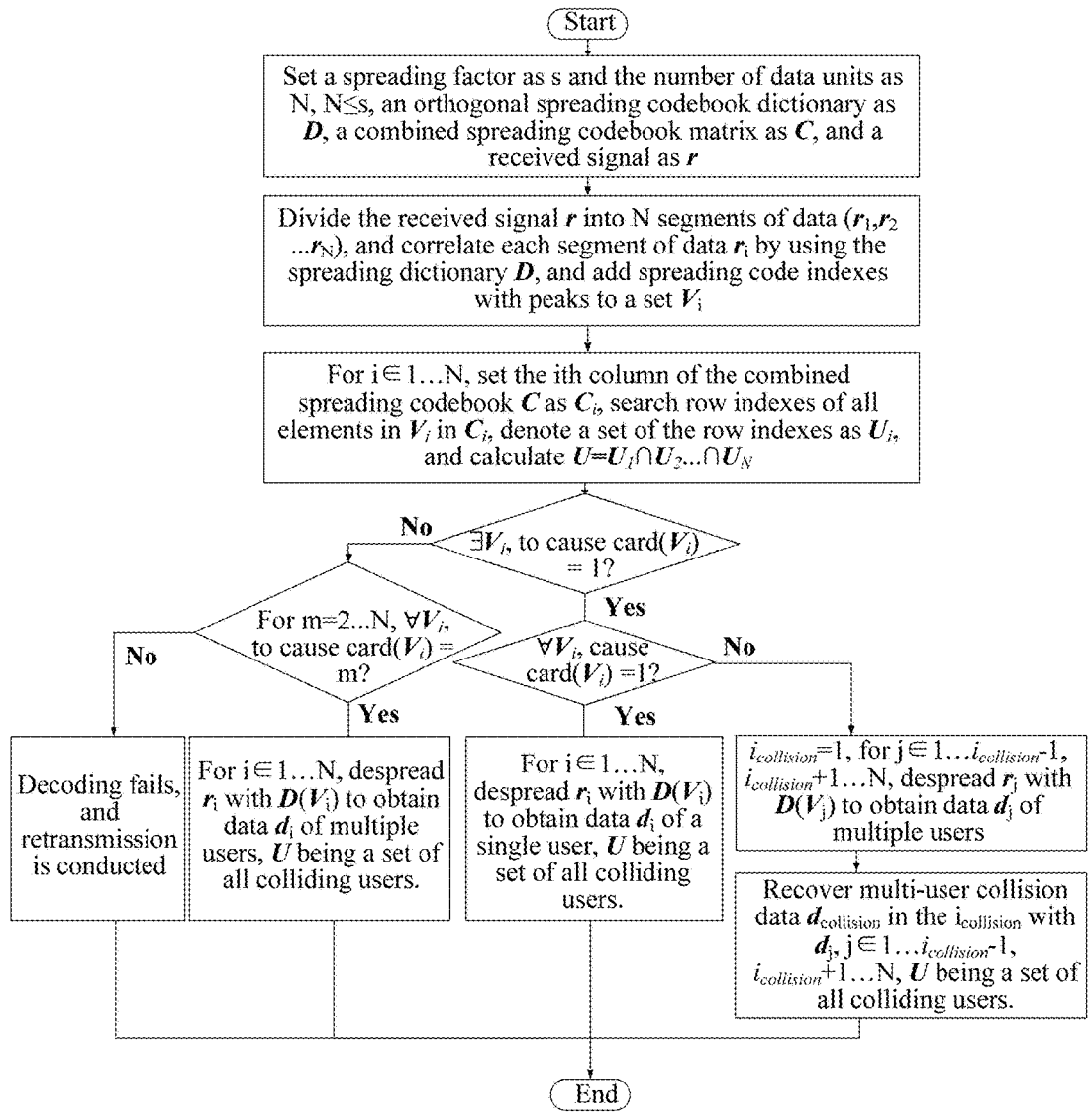
FIG. 3(h) is a flowchart of an algorithm of receiving recovered data.

A data recovery algorithm of receivers of receiving end devices corresponding to the method of this embodiment is as shown in FIG. 3(h). The algorithm requires five inputs, which are a spreading factor s of the system, the number N (N≤s) of data units included in each predetermined data transmission unit, a spreading code codebook (an orthogonal spreading code dictionary D shown in the figure), a combined spreading codebook C and a received signal r respectively. At first, the receiver divides the received signal r into N segments ($r_1,r_2 \ldots r_N$), each segment of data corresponds to one data unit, then the orthogonal spreading code dictionary D is used to correlate each segment of data $r_i$, and spreading code indexes with peaks are added to a set $V_i$, that is, an element in the set $V_i$ represents that the data unit $r_i$ has data spread by a spreading code corresponding to the element. Then, for $C_i$ in the ith column of the combined spreading codebook, row indexes of all elements in $V_i$ in $C_i$ are searched, that is, candidate users possibly existing on the data segment $r_i$ are searched from $C_i$, a set of the row indexes is denoted as $U_i$, that is, a candidate user set, and after corresponding candidate user sets $U_i$ are calculated for all the data units $r_i$, a total candidate user set $U=U_1 \cap U_2 \ldots \cap U_N$ is calculated.

By taking FIG. 3(e) as an example, suppose that three users using combined spreading codes 1, 3 and 6 collide at the receiving end in FIG. 3(e), the received signal is divided into four segments ($r_1,r_2,r_3,r_4$), blank, left oblique stripe, vertical stripe and right oblique stripe represent four different orthogonal spreading codes respectively, indexes thereof are 1, 2, 3, 4, and the set thereof is a spreading dictionary D. At first, the spreading dictionary D is used to correlate each data segment of the received signal, and it can be obtained that spreading code index sets of the data segments are $V_1=(1,2)$, $V_2=(1,3)$, $V_3=(1,4)$, $V_4=(1,2,3)$. Then, for the combined spreading codebook C, row indexes of $V_1$ in a column vector $C_1$, $V_2$ in $C_2$, $V_3$ in $C_3$, and $V_4$ in $C_4$ are searched respectively, it can be obtained that row index sets thereof are $U_1=(1,2, \ldots, 8)$, $U_2=(1,3,6,7,9,10,14,16)$, $U_3=(1,3,6,7,11,12,13,15)$ and $U_4=(1,3,4,5,6,8,9,11,12,14,15,16)$, and then a total user candidate set $U=U_1 \cap U_2 \ldots \cap U_n=(1,3,6)$ is obtained. It can thus be seen that, in such an example, that is, when N=4, colliding users in the case of three or fewer user collisions may be identified; in the example, as the receiving end device has known the corresponding relationship between the combined spreading codes and the users, it can be determined through the above process that three users using combined spreading codes 1, 3 and 6 collide at the receiving end.

After detection of a candidate user set, a receiver will search a spreading code index set $V_i$ of each data segment to find where a $V_i$ exists, which only has one element, that is, card($V_i$)=1. If yes, it proves that all colliding users use the same spreading code in the same data segment, that is, overlapping positions of all colliding users are identical, which is a situation of user collision alignment. At this point, the receiver makes further judgment to identify whether the number of elements is 1 for the spreading code index set $V_i$ of any data segment, that is, $\forall V_i$, and whether card($V_i$)=1. If it is still yes, it proves that the current receiver only receives data of a single user and collision does not exist, and thus the receiver can directly call a corresponding spreading code D($V_i$) from the orthogonal spreading code dictionary D according to the spreading code index set $V_i$ to despread and decode each data segment $r_i$ to obtain data $d_i$, and the algorithm ends. If, for $\forall V_i$, card($V_i$)=1 is not established, it proves that it is not a situation of a single user although it is a situation of user collision alignment, and thus, at this point, the receiver needs a redundant segment to recover data segments in multi-user collision positions. Therefore, a data segment position where card($V_i$)=1 exists is set as i, that is, the data segment position of collision alignment is $i_{collision}$, then a corresponding spreading code D($V_i$) is called from the orthogonal spreading code dictionary D according to the spreading code index set $V_i$ to despread and decode each data segment $r_i$ to obtain data $d_i$, finally the data segment decoded by each user is used to recover the colliding data segment $i_{collision}$, and the algorithm ends. However, if the situation of collision alignment does not exist, that is, no $V_i$ exists to cause card($V_i$)=1, at this point, it is necessary to judge that, for each $V_i$, the number of elements thereof is equal to an integer m in 1 to the number N of the data segments, that is, for m=1 . . . . N, whether $\forall V_i$ causes card($V_i$)=m. If yes, it proves that the combined spreading codes used by current colliding users are orthogonal to each other and in a situation of non-collision, at this point, the receiver can directly call a corresponding spreading code D($V_i$) from the orthogonal spreading code dictionary D according to the spreading code index set $V_i$ to despread and decode each data segment $r_i$ to obtain data $d_i$, and the algorithm ends. If no, it proves that the combined spreading codes of the colliding users now are neither orthogonal to each other nor in a situation of collision alignment, and at this point, the receiver gives up decoding the received signal, the colliding users conduct retransmission, and the algorithm ends.

To sum up, the method of this embodiment, by using combined spreading codes, can help the receiving end devices to detect the number of colliding users, identify the colliding users and correctly recover data.

Figure 4:
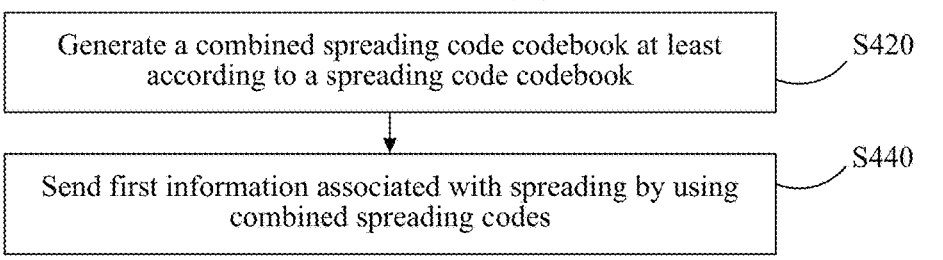
FIG. 4 is an exemplary flowchart of a spreading control method according to an embodiment of the present application.

FIG. 4 is an exemplary flowchart of a spreading control method according to an embodiment of the present application. The method is performed by a receiving end device which may be a base station. As shown in FIG. 4, the method comprises:

S420. Generate a combined spreading code codebook at least according to a spreading code codebook.

The spreading code codebook comprises at least N spreading codes which comprise at least two orthogonal spreading codes (preferably, the number of the at least two orthogonal spreading codes is equal to the number of system available orthogonal spreading codes). The combined spreading code codebook comprises at least M first combined spreading codes which comprise N spreading codes, the N is an integer not less than 2, and in order to be capable of detecting colliding users using the first combined spreading code to conduct spreading, at most one of spreading codes in corresponding positions of any two of the at least M first combined spreading codes is the same; different spreading codes are orthogonal spreading codes when the spreading codes forming the same first combined spreading code comprise different spreading codes, wherein M is an integer not less than 2. Thus, when any two users using the first combined spreading code to conduct spreading collide, at most only one data unit cannot be correctly recovered by the receiver, and preferably, M is an integer not less than the number of system available orthogonal spreading codes.

S440. Send first information associated with spreading by using combined spreading codes, the first information being used for determining at least one first combined spreading code.

As described in FIG. 3(a), the first combined spreading code is a combined spreading code in a possible composition form, and according to different objectives to be achieved by using the combined spreading code, combined spreading codes in other possible composition forms may be used, for example, N has different values. The first information refers to any information that can be used for indicating that the combined spreading code should be used to conduct spreading and/or how to determine the first combined spreading code to be used; such information comprises, but is not limited to, a control instruction for indicating that combined spreading codes should be used to conduct spreading, information directly indicating the first combined spreading code that should be used, information for indicating how the first combined spreading code should be determined, or any other information associated with spreading by using combined spreading codes.

Specifically, in step S420, it is feasible to generate the combined spreading code codebook C in various suitable manners (e.g., the method (I) and method (II) above), and it is only necessary to make $\forall c_i, c_j \square C$ and $O(c_i, c_j) \leq 1$, wherein $O(c_i, c_j)$ refers to the overlapping number of the combined spreading codes $c_i$ and $c_j$, that is, the number of identical spreading codes in the corresponding positions.

As stated above, the first information may be any information associated with spreading by using combined spreading codes. In one possible implementation manner, the first information may comprise: the first combined spreading code. In such an implementation manner, the transmitting end device may directly obtain the first combined spreading code to be used according to the first information. For example, the base station may allocate the first combined spreading code to be used to at least some of the user equipments, and directly notify the corresponding user equipments of the first combined spreading code through the first information.

In another possible implementation manner, the first information comprises: index information corresponding to N spreading codes corresponding to the N data units. In such an implementation manner, the transmitting end device can have the spreading code codebook, and spreading codes in the spreading code codebook has corresponding indexes; the first combined spreading code to be used may be determined according to the index information and the spreading code codebook.

It should be noted that the spreading code codebook may be known to each transmitting end device, and may also be dynamically acquired in a communication process, for example, the user equipments acquire the spreading code codebook from a base station. In this case, the method of this embodiment may further comprise:

S410. Send second information associated with the spreading code codebook, the second information being used to determine the spreading code codebook. Moreover, in such an implementation manner, it is still the base station that allocates the first combined spreading code to be used to at least part of the user equipments, but the allocation is notified to the user equipments through corresponding index information.

In another possible implementation manner, the first information comprises: a control instruction of using combined spreading codes to conduct spreading. In such an implementation manner, step S420 may further comprise:

S422. Generate the combined spreading code codebook in response to that the number of users in a system needing to use orthogonal spreading codes to conduct spreading is over the number of system available orthogonal spreading codes.

Alternatively,

In such an implementation manner, step S440 may further comprise:

S442. Send the first information in response to that the number of users in a system needing to use orthogonal spreading codes to conduct spreading is over the number of system available orthogonal spreading codes.

The control instruction may be sent from a receiving end device to a transmitting end device, for example, a base station determines that the number of users needing to use orthogonal spreading code to conduct spreading in a current system exceeds the number of available orthogonal spreading codes according to global information, and as a response, sends the control instruction. The first information may further comprise: third information for indicating the N. In this case, the transmitting end device may directly select, for example, randomly select, the N orthogonal spreading codes forming the first combined spreading code from the spreading code codebook at least according to the third information, or generate the combined spreading code codebook according to the third information with, for example, the method (I) and method (II) above.

The method of this embodiment further comprises:

S460. Receive at least one predetermined data transmission unit of data spread by using the first combined spreading code, the predetermined data transmission unit comprising N data units which comprise at least one first unit and at least one second unit, the at least one first unit comprising data to be sent, and the at least one second unit being configured to recover the at least one first unit.

The predetermined data transmission unit may have a length of data that should be spread with one orthogonal spreading code, and may also have any other lengths meeting a transmission demand. Due to presence of the at least one second unit, when any two users using the first combined spreading code to conduct spreading collide and at most only one date unit cannot be correctly recovered by the receiver, the at least one second unit can be used to correctly recover data of the at most one unit.

In one possible implementation manner, the N data units comprise at least one first unit and a second unit, and the second unit is a function of data comprised in the at least one first unit. As shown in FIG. 3(b), by taking N=4 as an example, a predetermined data transmission unit of data to be sent is divided into N−1=3 parts, that is, three first units, an exclusive OR value (module-2 sum) of data of the three first units is taken as a redundancy unit, that is, a second unit, and each data unit respectively corresponds to one spreading code of the first combined spreading code, which forms a predetermined data transmission unit of spreading code after spreading. According to the forming rule of the second unit, no matter which segment of the data of the four units is not correctly recovered, the data can be recovered with other three segments of data. The forming rule of the second unit may be known to both the sender and the receiver, or obtained dynamically in a communication process. After FIG. 3(b) illustrates that the second unit is placed behind the third first unit, it may also be placed in other positions, for example, between any two first units, which does not limit the embodiments of the present application herein.

S480. Recover the received predetermined data transmission unit of data. A specific recovering method has been detailed above in combination with FIG. 3(h).

To sum up, the method of this embodiment, by making the transmitting end device use combined spreading codes, can detect the number of colliding users, identify the colliding users and correctly recover data.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

In addition, an embodiment of the present application further provides a computer readable medium, comprising a computer readable instruction performing the following operations when being executed: performing the operations of the steps of the method in the implementation manner shown in FIG. 3(a).

In addition, an embodiment of the present application further provides a computer readable medium, comprising a computer readable instruction performing the following operations when being executed: performing the operations of the steps of the method in the implementation manner shown in FIG. 4.

Figure 5A:
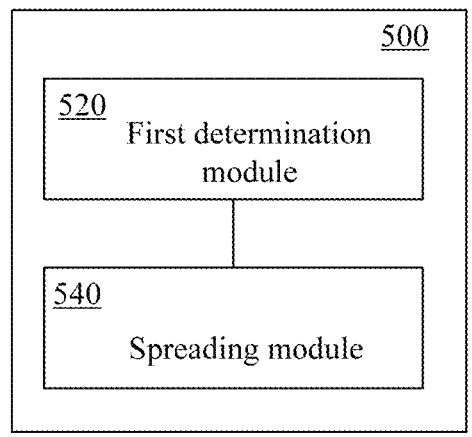
FIG. 5(a) to FIG. 5(e) are exemplary structural diagrams of a spreading apparatus according to an embodiment of the present application.

FIG. 5(a) is an exemplary structural diagram of a spreading apparatus according to an embodiment of the present application. The apparatus may belong to a transmitting end device which may be any user equipment. As shown in FIG. 5(a), the apparatus 500 comprises:

a first determination module 520, configured to determine a first combined spreading code to be used at least according to first information associated with spreading by using combined spreading codes, the first combined spreading code comprising N spreading codes, and N being an integer not less than 2.

In the apparatus of this embodiment, the first combined spreading code is a combined spreading code in a possible composition form, and according to different objectives to be achieved by using the combined spreading code, combined spreading codes in other possible composition forms may be used, for example, N has different values. The first information refers to any information that can be used for indicating that the combined spreading code should be used to conduct spreading and/or how to determine the first combined spreading code to be used; such information comprises, but is not limited to, a control instruction for indicating that combined spreading codes should be used to conduct spreading, information directly indicating the first combined spreading code that should be used, information for indicating how the first combined spreading code should be determined, or any other information associated with spreading by using combined spreading codes. The first combined spreading code is determined at least according to a spreading code codebook, the spreading code codebook comprises at least N spreading codes which comprise at least two orthogonal spreading codes (preferably, the number of the at least two orthogonal spreading codes is equal to the number of system available orthogonal spreading codes) and form at least M first combined spreading codes, and in order to be capable of detecting colliding users using the first combined spreading code to conduct spreading, at most one of spreading codes in corresponding positions of any two of the at least M first combined spreading codes is the same; different spreading codes are orthogonal spreading codes when the spreading codes forming the same first combined spreading code comprise different spreading codes, wherein M is an integer not less than 2. Thus, when any two users using the first combined spreading code to conduct spreading collide, at most only one data unit cannot be correctly recovered by the receiver, and preferably, M is an integer not less than the number of system available orthogonal spreading codes.

In the application scenario of the overload system shown in FIG. 1, when the number of users needing to use orthogonal spreading codes to conduct spreading and even reaches or exceeds the number of available orthogonal spreading codes, the combined spreading code can be used to conduct spreading.

A spreading module 540, configured to spread N data units by using the first combined spreading code, wherein the N data units comprise at least one first unit and at least one second unit, the at least one first unit comprises data to be sent, and the at least one second unit is configured to recover the at least one first unit.

Due to presence of the at least one second unit, when any two users using the first combined spreading code to conduct spreading collide and at most only one date unit cannot be correctly recovered by the receiver, the at least one second unit can be used to correctly recover data of the at most one unit.

To sum up, the apparatus of this embodiment can effectively solve the problem of insufficient number of orthogonal spreading codes by using combined spreading codes.

Figure 5B:
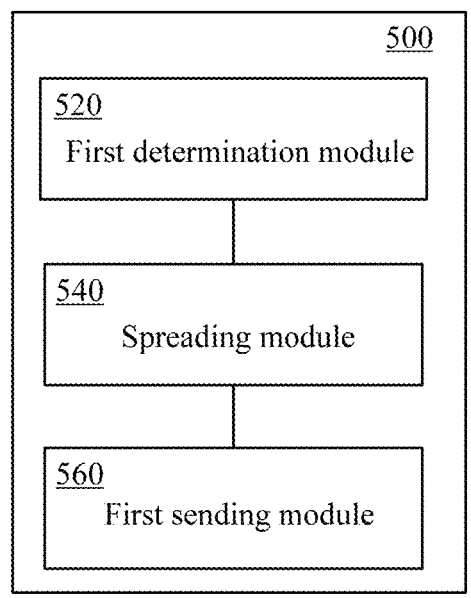

In the apparatus of the embodiments of the present application, the data to be sent may refer to original data, and may also refer to data obtained through channel encoding, rate matching, modulation or any other pre-processing prior to sending, that is, such data is spread by using the apparatus of the embodiments of the present application. In order to enable the receiver to correctly recover the data in the case of possible collision, the apparatus of this embodiment may send data at least with a predetermined data transmission unit, the predetermined data transmission unit comprises N data units, and each data unit correspondingly forms one spreading code of the first combined spreading code, that is, the spreading codes of the first combined spreading code are used to spread the corresponding data units. In this case, as shown in FIG. 5(b), the apparatus 500 of this embodiment may further comprise:

A first sending module 560, configured to send data spread at least with the first combined spreading code by at least taking a predetermined data transmission unit as the unit.

The predetermined data transmission unit may have a length of data that should be spread with one orthogonal spreading code, and may also have any other lengths meeting a transmission demand. It should be noted that the term "recover" refers to obtaining original data through a process such as demodulation and decoding corresponding to the above pre-processing process. The at least one second unit is sufficiently configured to recover any data of the at least one first unit. In one possible implementation manner, the N data units comprise at least one first unit and a second unit, and the second unit is a function of data comprised in the at least one first unit. As shown in FIG. 3(b), by taking N=4 as an example, a predetermined data transmission unit of data to be sent is divided into N−1=3 parts, that is, three first units, an exclusive OR value (module-2 sum) of data of the three first units is taken as a redundancy unit, that is, a second unit, and each data unit respectively corresponds to one spreading code of the first combined spreading code, which forms a predetermined data transmission unit of spreading code after spreading. According to the forming rule of the second unit, no matter which segment of the data of the four units is not correctly recovered, the data can be recovered with other three segments of data. The forming rule of the second unit may be known to both the sender and the receiver, or obtained dynamically in a communication process. After FIG. 3(b) illustrates that the second unit is placed behind the third first unit, it may also be placed in other positions, for example, between any two first units, which does not limit the embodiments of the present application herein.

It should also be noted that the value of N is related to the length D of the data to be transmitted, and preferably, N does not exceed a spreading factor s of the system. The data to be transmitted may be divided into $L=\lceil D/s \rceil$ data units, every N data units form a predetermined data transmission unit, if D/s is not an integer, data that cannot form a data unit may be allowed to form a data transmission unit which comprises less than N data units. As shown in FIG. 3(c), the data to be transmitted may be divided into $L=\lceil D/s \rceil$ data units, the spreading factor s of the system is 4, every N=4 data units form a predetermined data transmission unit, but the last transmission unit comprises N'=3 data units.

As stated above, the first information may be any information associated with spreading by using combined spreading codes. In one possible implementation manner, the first information comprises: the first combined spreading code. In such an implementation manner, the first determination module 520 may directly obtain the first combined spreading code to be used according to the first information. For example, the transmitting end device may be user equipments, and the base station may allocate the first combined spreading code to be used to at least some of the user equipments. The base station may allocate a first combined spreading code corresponding to a user equipment to the user equipment in any suitable manner, and the allocation manner does not limit the embodiments of the present application. Such an allocation manner comprises, but is not limited to, random allocation, the base station may randomly allocate a certain number of first combined spreading codes to a corresponding number of user equipments connected with the base station, at a certain time, some of the user equipments have been activated to send data, while some are in silence and do not transmit data; for allocation according to channel states of the user equipments, the user equipments in the same or similar channel states are grouped, spreading codes in corresponding positions of the first combined spreading codes allocated to any two user equipments in one group are all orthogonal, so as to try to ensure reduction of the Near-Far Effect when multiple users in one group send data; for allocation according to service states of the user equipments, the user equipments of the same or similar service type are grouped, spreading codes in corresponding positions of the first combined spreading codes allocated to any two user equipments in one group are all orthogonal, in such a service, for example, under a forest fire danger sensor network, two sensors A and B transmit wind directions and humidity conditions of a certain plane respectively, and the services involved are both related to the probability reflecting occurrence of fire of the place; therefore, the possibility that the sensors A and B conduct transmission at the same time is greater, and thus the sensors A and B are grouped to use the first combined spreading codes completely orthogonal to each other.

It should be noted that allocation of the first combined spreading codes may be conducted at the beginning of access to the base station and may also be conducted in real time, but the receiving end device has to know a corresponding relationship between the first combined spreading codes and the user equipments; when the receiving end device is not the base station, it may be known by acquiring an allocation rule from the base station or directly acquiring the corresponding relationship.

In another possible implementation manner, the first information comprises: index information corresponding to N spreading codes corresponding to the N data units. In such an implementation manner, the transmitting end device can have the spreading code codebook, and spreading codes in the spreading code codebook has corresponding indexes;

the first combined spreading code to be used may be determined according to the index information and the spreading code codebook. That is, the first determination module 520 may be configured to, at least according to the index information, determine the first combined spreading code according to the spreading code codebook.

Figure 5C:
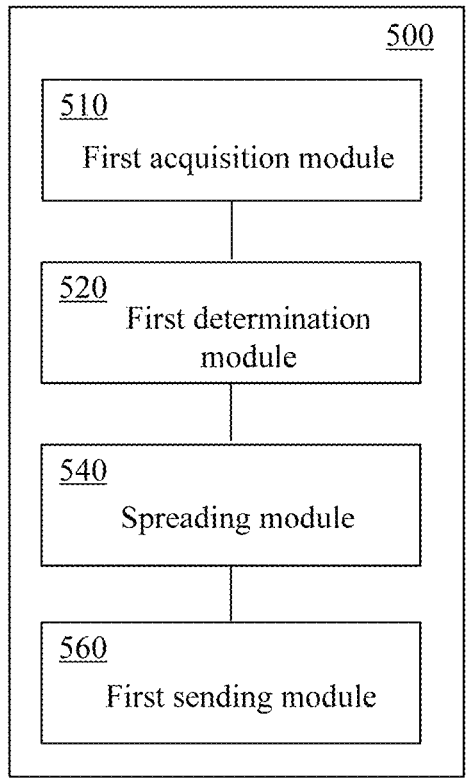

It should be noted that the spreading code codebook may be known to each transmitting end device, and may also be dynamically acquired in a communication process, for example, the user equipments acquire the spreading code codebook from a base station. In this case, as shown in FIG. 5(c), the apparatus 500 of this embodiment may further comprise:

a first acquisition module 510, configured to acquire second information associated with the spreading code codebook, the second information being used for determining the spreading code codebook.

Moreover, in such an implementation manner, it is still the base station that allocates the first combined spreading code to be used to at least part of the user equipments, but the allocation is notified to the user equipments through corresponding index information.

In another possible implementation manner, the first information comprises: a control instruction of using combined spreading codes to conduct spreading. In such an implementation manner, the first determination module 520 may be configured to determine the first combined spreading code in response to receipt of the control instruction.

The control instruction may be sent from a receiving end device to a transmitting end device, for example, a base station determines that the number of users needing to use orthogonal spreading code to conduct spreading in a current system exceeds the number of available orthogonal spreading codes according to global information, and as a response, sends the control instruction. The first information may further comprise: third information for indicating the N. In this case, the first determination module 520 may be configured to directly select, for example, randomly select, the N orthogonal spreading codes forming the first combined spreading code from the spreading code codebook at least according to the third information.

Figure 5D:
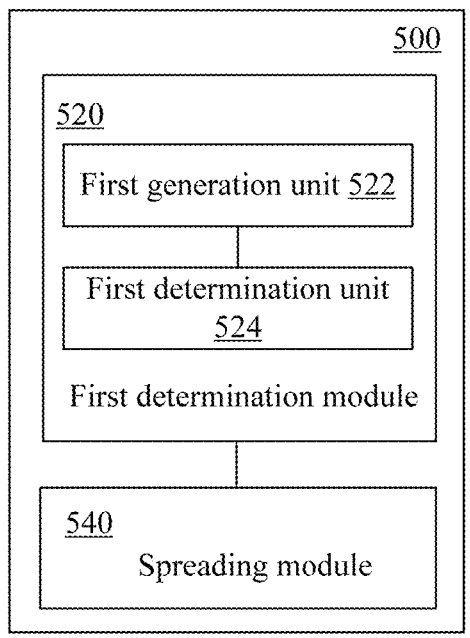

In addition, the first determination module 520 may generate a combined spreading code codebook according to the spreading code codebook and then determine the first combined spreading code to be used according to the combined spreading code codebook. Specifically, as shown in FIG. 5(d), the first determination module 520 may further comprise:

A first generation unit 522, configured to generate a combined spreading code codebook at least according to the first information.

A first determination unit 524, configured to determine the first combined spreading code at least according to the combined spreading code codebook.

The combined spreading code codebook comprises at least M first combined spreading codes formed by the at least N spreading codes, and meets: at most one of spreading codes in corresponding positions of any two of the at least M first combined spreading codes is the same; different spreading codes are orthogonal spreading codes when the spreading codes forming the same first combined spreading code comprise different spreading codes, wherein M is an integer not less than 2.

A first generation unit 522 may generate the combined spreading code codebook C in various suitable manners, and it is only necessary to make $\forall c_i, c_j \square C$ and $O(c_i, c_j) \leq 1$, wherein $O(c_i, c_j)$ refers to the overlapping number of the combined spreading codes $c_i$ and $c_j$, that is, the number of identical spreading codes in the corresponding positions.

Two possible methods of generating a combined spreading code codebook are described below, but the present application is not limited thereto.

Method (I)

As shown in FIG. 3(d), the spreading factor s of the system and the number N of the data units are taken as inputs, and N≤s. During initialization, a homogeneous combined spreading code set $C_h$ is in an initial state of a codebook set C; herein, the homogeneous combined spreading code refers to that N data units comprised in the predetermined transmission unit are spread by one kind of spreading codes, for example, first and fourth combined spreading codes in FIG. 3(e) are all homogeneous combined spreading codes; therefore, there may be a total of s homogeneous combined spreading codes for a given spreading factor s, and then the initial codebook has s combined spreading codes. After the initialization, N of the s orthogonal spreading codes are arranged, and a permutation set P=Perms(s, N) can be obtained, which becomes a parent set. Then, a corresponding combined spreading code subset Q is searched for all the combined spreading codes p in the parent set P, so that the overlapping number of any combined spreading codes q and p in Q is greater than or equal to 2, that is, $O(p, q) \geq 2$, and the subset Q is also referred to as an overlapping subset. After the corresponding overlapping subset Q is found for each $p \square P$, the number of combined spreading codes that it has is calculated, that is, card(Q), denoted as $m_p$. Then, p having the minimum $m_p$ is searched for all the combined spreading codes $p \square P$, which is denoted as $p_{min}$, and the minimum value thereof is also denoted as $m_{min}$. Then, the $p_{min}$ having the minimum value $m_{min}$ may be used as a reasonable combined spreading code of the combined spreading code codebook set, and thus may be added to the combined spreading code codebook set C. Then, it is necessary to search a corresponding overlapping subset $Q_{min}$ for the selected combined spreading code $p_{min}$ and delete it from the parent set P. The process is repeated so until the parent set P is null, and then the process ends. It should be noted that the method is a method of exclusion performed based on a combined spreading code codebook generation rule, and the obtained combined spreading code codebook is reasonable but incomplete.

Method (II)

The present application further provides another combined spreading code codebook generation algorithm, called an extended cyclic shift method. As shown in FIG. 3(f), the method requires the number of available orthogonal spreading codes in the system to be equal to the number of data units in a predetermined transmission unit, that is, N=s, s is required to be a prime, $s^2$ combined spreading codes may be generated, and in each data unit of the $s^2$ combined spreading codes, s orthogonal spreading codes are all repeated s times; in FIG. 3(f), an orthogonal spreading code dictionary is a set of system available orthogonal spreading codes. FIG. 3(g) is an example of five orthogonal spreading codes generated so (s=5), at first, the five orthogonal spreading codes $[s_1, s_2, s_3, s_4, s_5]$ are shifted one spreading code to the left, five combined spreading codes are generated in the first group, then the second group of combined spreading codes are generated by cyclically arranging the first group of combined spreading codes at an interval of 1 bit, that is, $[s_1, s_3, s_5, s_2, s_4]$, $[s_2, s_4, s_1, s_3, s_5]$, $[s_3, s_5, s_2, s_4, s_1]$, $[s_4, s_1, s_3, s_5, s_2]$ and $[s_5, s_2, s_4, s_1, s_3]$, then the third group of combined spreading codes are generated by cyclically arranging the first group of combined spreading codes at an interval of 2 bits, until the fifth group of combined spreading codes are generated by cyclically arranging the first group of combined spreading codes at an interval of 4 bits, that is, $[s_1, s_1, s_1, s_1, s_1]$, $[s_2, s_2, s_2, s_2, s_2]$, $[s_3, s_3, s_3, s_3, s_3]$, $[s_4, s_4, s_4, s_4, s_4]$ and $[s_5, s_5, s_5, s_5, s_5]$.

Figure 5E:
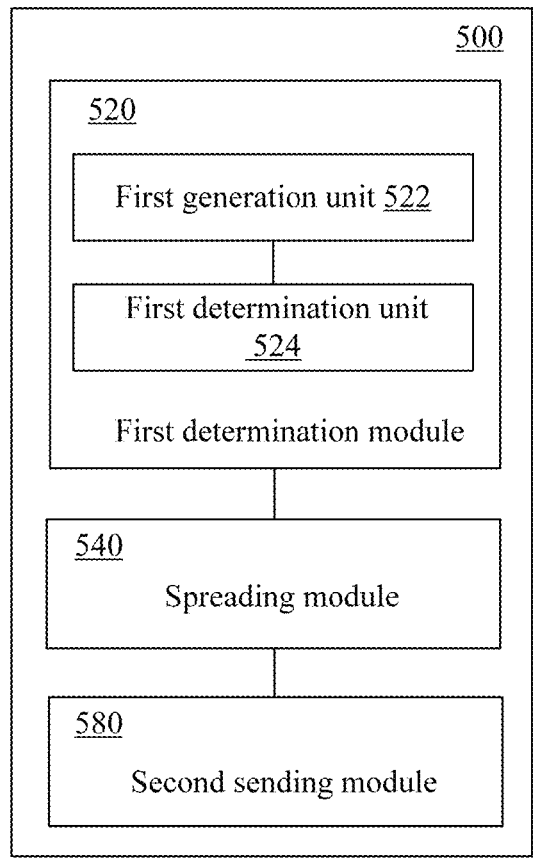

After the combined spreading code codebook is generated, in step S328, it is feasible to arbitrarily (e.g., randomly) select one first combined spreading code from the combined spreading code codebook as the first combined spreading code to be used. However, it should be noted that, no matter which method is used to generate such a codebook, in such an implementation manner, for a system, all the transmitting end devices should generate identical combined spreading code codebooks, and in order to enable receiving end devices to correctly recover data, it is necessary to notify the receiving end devices of information associated with the combined spreading code codebook, so that the receiving end devices can determine the corresponding transmitting end devices through the first combined spreading code if necessary. Correspondingly, as shown in FIG. 5(e), the apparatus 500 of this embodiment further comprises:

A second sending module 580, configured to send fourth information associated with the determined first combined spreading code, the fourth information being used for determining first combined spreading codes used by transmitting end devices. For example, the fourth information may be the first combined spreading codes per se, may be the combined spreading code codebook per se and indexes of the corresponding first combined spreading codes, may also be other information associated with how to generate the combined spreading code codebook and indexes of the corresponding first combined spreading codes, and so on.

How the receiving end devices detect collision and recover data according to the method of this embodiment is described below through specific examples.

A data recovery algorithm of receivers of receiving end devices corresponding to the method of this embodiment is as shown in FIG. 3(h). The algorithm requires five inputs, which are a spreading factor s of the system, the number N (N≤s) of data units included in each predetermined data transmission unit, a spreading code codebook (an orthogonal spreading code dictionary D shown in the figure), a combined spreading codebook C and a received signal r respectively. At first, the receiver divides the received signal r into N segments $(r_1, r_2 \ldots r_N)$, each segment of data corresponds to one data unit, then the orthogonal spreading code dictionary D is used to correlate each segment of data and spreading code indexes with peaks are added to a set $V_i$, that is, an element in the set $V_i$ represents that the data unit $r_i$ has data spread by a spreading code corresponding to the element. Then, for $C_i$ in the ith column of the combined spreading codebook, row indexes of all elements in $V_i$ in $C_i$ are searched, that is, candidate users possibly existing on the data segment $r_i$ are searched from $C_i$, a set of the row indexes is denoted as $U_i$, that is, a candidate user set, and after corresponding candidate user sets $U_i$ are calculated for all the data units $r_i$, a total candidate user set $U=U_1 \cap U_N$ is calculated.

By taking FIG. 3(e) as an example, suppose that three users using combined spreading codes 1, 3 and 6 collide at the receiving end in FIG. 3(e), the received signal is divided into four segments $(r_1,r_2,r_3,r_4)$, blank, left oblique stripe, vertical stripe and right oblique stripe represent four different orthogonal spreading codes respectively, indexes thereof are 1, 2, 3, 4, and the set thereof is a spreading dictionary D. At first, the spreading dictionary D is used to correlate each data segment of the received signal, and it can be obtained that spreading code index sets of the data segments are $V_1=(1,2)$, $V_2=(1,3)$, $V_3=(1,4)$, $V_4=(1,2,3)$. Then, for the combined spreading codebook C, row indexes of $V_1$ in a column vector $C_1$, $V_2$ in $C_2$, $V_3$ in $C_3$, and $V_4$ in $C_4$ are searched respectively, it can be obtained that row index sets thereof are $U_1=(1,2, \ldots, 8)$, $U_2=(1,3,6,7,9,10,14,16)$, $U_3=(1,3,6,7,11,12,13,15)$ and $U_4=(1,3,4,5,6,8,9,11,12,14,15,16)$, and then a total user candidate set $U=I_1 \cap U_2 \ldots \cap U_n=(1,3,6)$ is obtained. It can thus be seen that, in such an example, that is, when N=4, colliding users in the case of three or fewer user collisions may be identified; in the example, as the receiving end device has known the corresponding relationship between the combined spreading codes and the users, it can be determined through the above process that three users using combined spreading codes 1, 3 and 6 collide at the receiving end.

After detection of a candidate user set, a receiver will search a spreading code index set $V_i$ of each data segment to find where a $V_i$ exists, which only has one element, that is, card$(V_i)$=1. If yes, it proves that all colliding users use the same spreading code in the same data segment, that is, overlapping positions of all colliding users are identical, which is a situation of user collision alignment. At this point, the receiver makes further judgment to identify whether the number of elements is 1 for the spreading code index set $V_i$ of any data segment, that is, $\forall V_i$, and whether card$(V_i)$=1. If it is still yes, it proves that the current receiver only receives data of a single user and collision does not exist, and thus the receiver can directly call a corresponding spreading code D($V_i$) from the orthogonal spreading code dictionary D according to the spreading code index set $V_i$ to despread and decode each data segment $r_i$ to obtain data $d_i$, and the algorithm ends. If, for $\forall V_i$, card$(V_i)$=1 is not established, it proves that it is not a situation of a single user although it is a situation of user collision alignment, and thus, at this point, the receiver needs a redundant segment to recover data segments in multi-user collision positions. Therefore, a data segment position where card$(V_i)$=1 exists is set as i, that is, the data segment position of collision alignment is $i_{collision}$, then a corresponding spreading code D($V_i$) is called from the orthogonal spreading code dictionary D according to the spreading code index set V to despread and decode each data segment $r_i$ to obtain data $d_i$, finally the data segment decoded by each user is used to recover the colliding data segment $i_{collision}$, and the algorithm ends. However, if the situation of collision alignment does not exist, that is, no $V_i$ exists to cause card$(V_i)$=1, at this point, it is necessary to judge that, for each $V_i$, the number of elements thereof is equal to an integer m in 1 to the number N of the data segments, that is, for m=1 . . . N, whether $\forall V_i$ causes card$(V_i)$=m. If yes, it proves that the combined spreading codes used by current colliding users are orthogonal to each other and in a situation of non-collision, at this point, the receiver can directly call a corresponding spreading code D($V_i$) from the orthogonal spreading code dictionary D according to the spreading code index set $V_i$ to despread and decode each data segment $r_i$ to obtain data $d_i$, and the algorithm ends. If no, it proves that the combined spreading codes of the colliding users now are neither orthogonal to each other nor in a situation of collision alignment, and at this point, the receiver gives up decoding the received signal, the colliding users conduct retransmission, and the algorithm ends.

To sum up, the apparatus of this embodiment, by using combined spreading codes, can help the receiving end devices to detect the number of colliding users, identify the colliding users and correctly recover data.

Figure 6A:
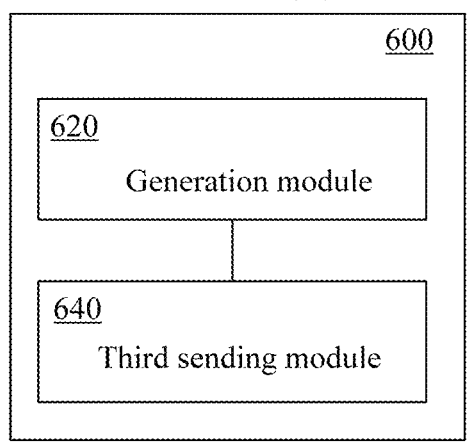
FIG. 6(a) to FIG. 6(c) are exemplary structural diagrams of a spreading control apparatus according to an embodiment of the present application.

FIG. 6(a) is an exemplary structural diagram of a spreading control apparatus according to an embodiment of the present application. The apparatus belongs to a receiving end device which may be a base station. As shown in FIG. 6(a), the apparatus 600 comprises:

A generation module 620, configured to generate a combined spreading code codebook at least according to a spreading code codebook.

The spreading code codebook comprises at least N spreading codes which comprise at least two orthogonal spreading codes (preferably, the number of the at least two orthogonal spreading codes is equal to the number of system available orthogonal spreading codes). The combined spreading code codebook comprises at least M first combined spreading codes which comprise N spreading codes, the N is an integer not less than 2, and in order to be capable of detecting colliding users using the first combined spreading code to conduct spreading, at most one of spreading codes in corresponding positions of any two of the at least M first combined spreading codes is the same; different spreading codes are orthogonal spreading codes when the spreading codes forming the same first combined spreading code comprise different spreading codes, wherein M is an integer not less than 2. Thus, when any two users using the first combined spreading code to conduct spreading collide, at most only one data unit cannot be correctly recovered by the receiver, and preferably, M is an integer not less than the number of system available orthogonal spreading codes.

A third sending module 640, configured to send first information associated with spreading by using combined spreading codes, the first information being used for determining at least one first combined spreading code.

As described in FIG. 3(a), the first combined spreading code is a combined spreading code in a possible composition form, and according to different objectives to be achieved by using the combined spreading code, combined spreading codes in other possible composition forms may be used, for example, N has different values. The first information refers to any information that can be used for indicating that the combined spreading code should be used to conduct spreading and/or how to determine the first combined spreading code to be used; such information comprises, but is not limited to, a control instruction for indicating that combined spreading codes should be used to conduct spreading, information directly indicating the first combined spreading code that should be used, information for indicating how the first combined spreading code should be determined, or any other information associated with spreading by using combined spreading codes.

Specifically, the generation module 620 may generate the combined spreading code codebook C in various suitable manners (e.g., the method (I) and method (II) above), and it is only necessary to make $\forall c_i,c_j \square C$ and $O(c_i, c_j) \leq 1$, wherein $O(c_i, c_j)$ refers to the overlapping number of the combined spreading codes $c_i$ and $c_j$, that is, the number of identical spreading codes in the corresponding positions.

As stated above, the first information may be any information associated with spreading by using combined spreading codes. In one possible implementation manner, the first information may comprise: the first combined spreading code. In such an implementation manner, the transmitting end device may directly obtain the first combined spreading code to be used according to the first information. For example, the base station may allocate the first combined spreading code to be used to at least some of the user equipments, and directly notify the corresponding user equipments of the first combined spreading code through the first information.

In another possible implementation manner, the first information comprises: index information corresponding to N spreading codes corresponding to the N data units. In such an implementation manner, the transmitting end device can have the spreading code codebook, and spreading codes in the spreading code codebook has corresponding indexes; the first combined spreading code to be used may be determined according to the index information and the spreading code codebook.

Figure 6B:
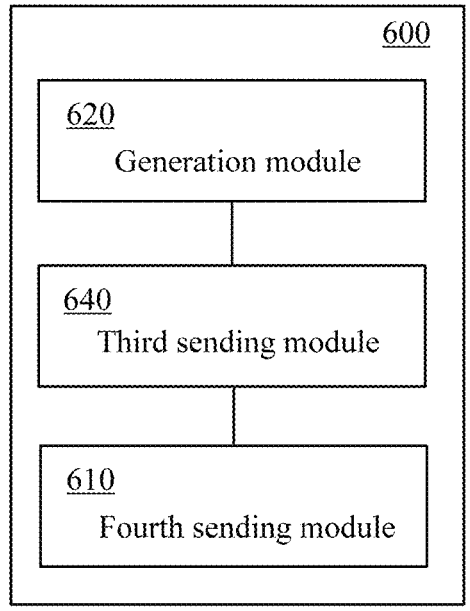

It should be noted that the spreading code codebook may be known to each transmitting end device, and may also be dynamically acquired in a communication process, for example, the user equipments acquire the spreading code codebook from a base station. In this case, as shown in FIG. 6(b), the apparatus 600 of this embodiment may further comprise:

A fourth sending module 610, configured to send second information associated with the spreading code codebook, the second information being used to determine the spreading code codebook. Moreover, in such an implementation manner, it is still the base station that allocates the first combined spreading code to be used to at least part of the user equipments, but the allocation is notified to the user equipments through corresponding index information.

In another possible implementation manner, the first information comprises: a control instruction of using combined spreading codes to conduct spreading. In such an implementation manner, the generation module 620 may generate the combined spreading code codebook in response to that the number of users in a system needing to use orthogonal spreading codes to conduct spreading is over the number of system available orthogonal spreading codes. Alternatively, the third sending module 640 may send the first information in response to that the number of users in a system needing to use orthogonal spreading codes to conduct spreading is over the number of system available orthogonal spreading codes.

The control instruction may be sent from a receiving end device to a transmitting end device, for example, a base station determines that the number of users needing to use orthogonal spreading code to conduct spreading in a current system exceeds the number of available orthogonal spreading codes according to global information, and as a response, sends the control instruction. The first information may further comprise: third information for indicating the N. In this case, the transmitting end device may directly select, for example, randomly select, the N orthogonal spreading codes forming the first combined spreading code from the spreading code codebook at least according to the third information, or generate the combined spreading code codebook according to the third information with, for example, the method (I) and method (II) above.

Figure 6C:
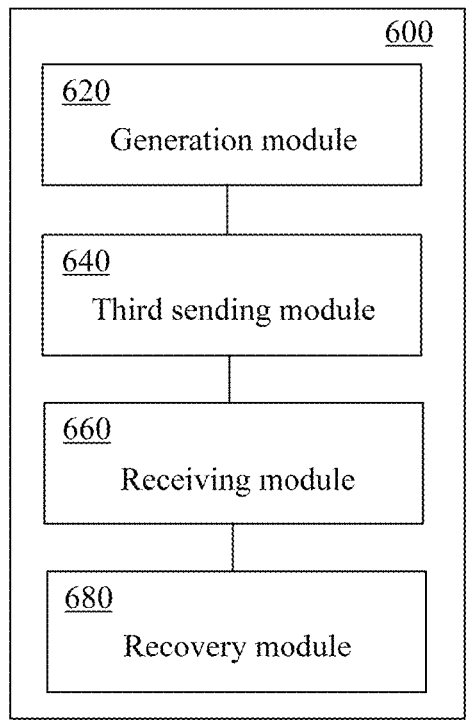

As shown in FIG. 6(c), the apparatus 600 of this embodiment further comprises:

A receiving module 660, configured to receive at least one predetermined data transmission unit of data spread by using the first combined spreading code, the predetermined data transmission unit comprising N data units which comprise at least one first unit and at least one second unit, the at least one first unit comprising data to be sent, and the at least one second unit being configured to recover the at least one first unit.

The predetermined data transmission unit may have a length of data that should be spread with one orthogonal spreading code, and may also have any other lengths meeting a transmission demand. Due to presence of the at least one second unit, when any two users using the first combined spreading code to conduct spreading collide and at most only one date unit cannot be correctly recovered by the receiver, the at least one second unit can be used to correctly recover data of the at most one unit.

In one possible implementation manner, the N data units comprise at least one first unit and a second unit, and the second unit is a function of data comprised in the at least one first unit. As shown in FIG. 3(b), by taking N=4 as an example, a predetermined data transmission unit of data to be sent is divided into N−1=3 parts, that is, three first units, an exclusive OR value (module-2 sum) of data of the three first units is taken as a redundancy unit, that is, a second unit, and each data unit respectively corresponds to one spreading code of the first combined spreading code, which forms a predetermined data transmission unit of spreading code after spreading. According to the forming rule of the second unit, no matter which segment of the data of the four units is not correctly recovered, the data can be recovered with other three segments of data. The forming rule of the second unit may be known to both the sender and the receiver, or obtained dynamically in a communication process. After FIG. 3(b) illustrates that the second unit is placed behind the third first unit, it may also be placed in other positions, for example, between any two first units, which does not limit the embodiments of the present application herein.

A recovery module 680, configured to recover the received predetermined data transmission unit of data. A specific recovering method has been detailed above in combination with FIG. 3(h).

To sum up, the apparatus of this embodiment, by making the transmitting end device use combined spreading codes, can detect the number of colliding users, identify the colliding users and correctly recover data.

The methods and apparatuses of the embodiments of the present application are further described below through specific examples.

Figure 7:
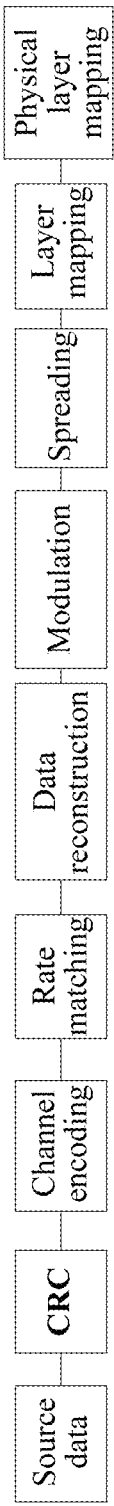
FIG. 7 is a schematic structural diagram of one possible transmitting end device including the spreading apparatus of this embodiment.

In this example, a transmitter structure using the method of this embodiment to conduct spreading is as shown in FIG. 7, the present application adopts a Multiple Carrier CDMA (MC-CDMA) mode on the basis of LTE and uses multiple sub-carriers to carry tandem spreading data spread by using tandem combined spreading codes provided in the present application, wherein, the spreading module (i.e., the spreading apparatus of the present application) is behind modulation, and a data reconstruction module is behind rate matching. By taking N=4 as an example, a combined spreading code codebook is as shown in FIG. 3(e), which comprises 16 first combined spreading codes. If data sent by two user equipments collides and the first combined spreading code 1 and the first combined spreading code 2 in the codebook are used respectively, it can be seen that the first combined spreading codes of the two user equipments overlap on the first data unit; however, limited by the forming rule of the codebook, the first combined spreading codes of the two user equipments do not overlap on other data units, and due to existence of a redundancy unit, the overlapping first data unit may be recovered through data of other data units.

Figure 8:
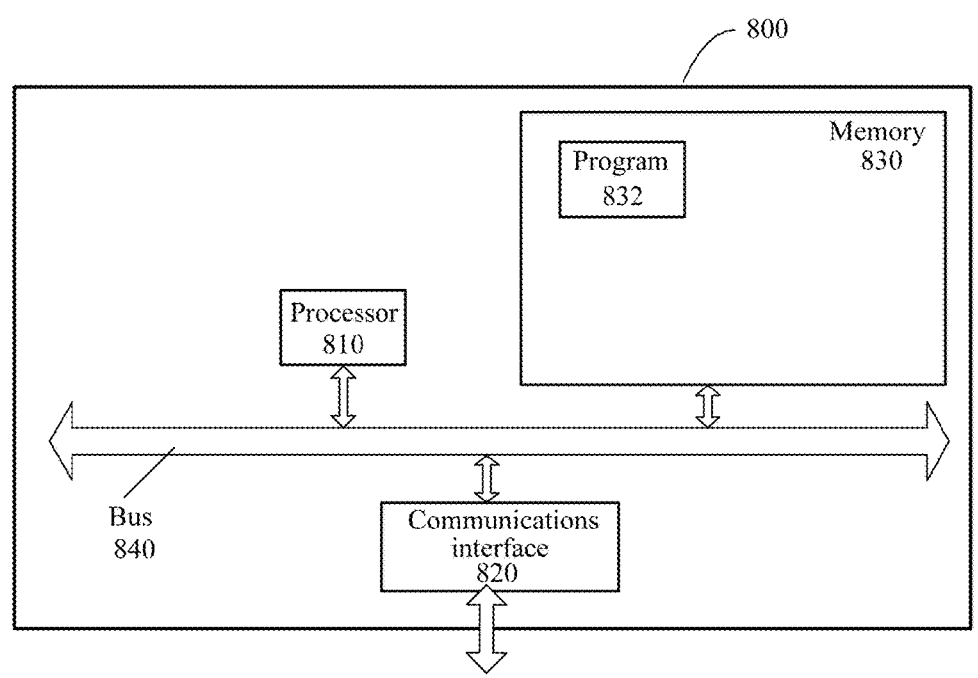
FIG. 8 is another exemplary structural diagram of a spreading apparatus according to an embodiment of the present application.

FIG. 8 is a schematic structural diagram of another example of a spreading apparatus according to an embodiment of the present application, and specific embodiments of the present application do not limit specific implementation of the spreading apparatus. As shown in FIG. 8, the spreading apparatus 800 may comprise:

a processor 810, a communications interface 820, a memory 830, and a communications bus 840.

The processor 810, the communications interface 820, and the memory 830 communicate with each other by using the communications bus 840.

The communications interface 820 is configured to communicate with a network element such as a client.

The processor 810 is configured to execute a program 832, and specifically, may implement relevant steps in the above method embodiments.

Specifically, the program 832 may comprise a program code comprising a computer operation instruction.

The processor 810 may be a central processing unit (CPU), or an application specific integrated circuit (ASIC), or one or more integrated circuits configured to implement the embodiments of the present application.

The memory 830 is configured to store the program 832. The memory 830 may comprise a high-speed random access memory (RAM), or may also comprise a non-volatile memory, for example, at least one magnetic disk memory. The program 832 may be specifically configured to cause the spreading apparatus 800 to perform the following steps: determining a first combined spreading code to be used at least according to first information associated with spreading by using combined spreading codes, the first combined spreading code comprising N spreading codes, and N being an integer not less than 2; and spreading N data units by using the first combined spreading code, wherein the N data units comprise at least one first unit and at least one second unit, the at least one first unit comprises data to be sent, and the at least one second unit is configured to recover the at least one first unit;

wherein the first combined spreading code is determined at least according to a spreading code codebook, the spreading code codebook comprises at least N spreading codes which comprise at least two orthogonal spreading codes and form at least M first combined spreading codes, at most one of spreading codes in corresponding positions of any two of the at least M first combined spreading codes is the same, and M is an integer not less than 2.

For specific implementation of the steps in the program 832, reference may be made to corresponding description in the corresponding steps and units in the embodiments, and no further details are provided herein again. Those skilled in the art may clearly know that, for the purpose of convenient and brief description, for a detailed working process of the foregoing device and modules, reference may be made to a corresponding process in the foregoing method embodiments, and no further details are provided herein again.

Figure 9:
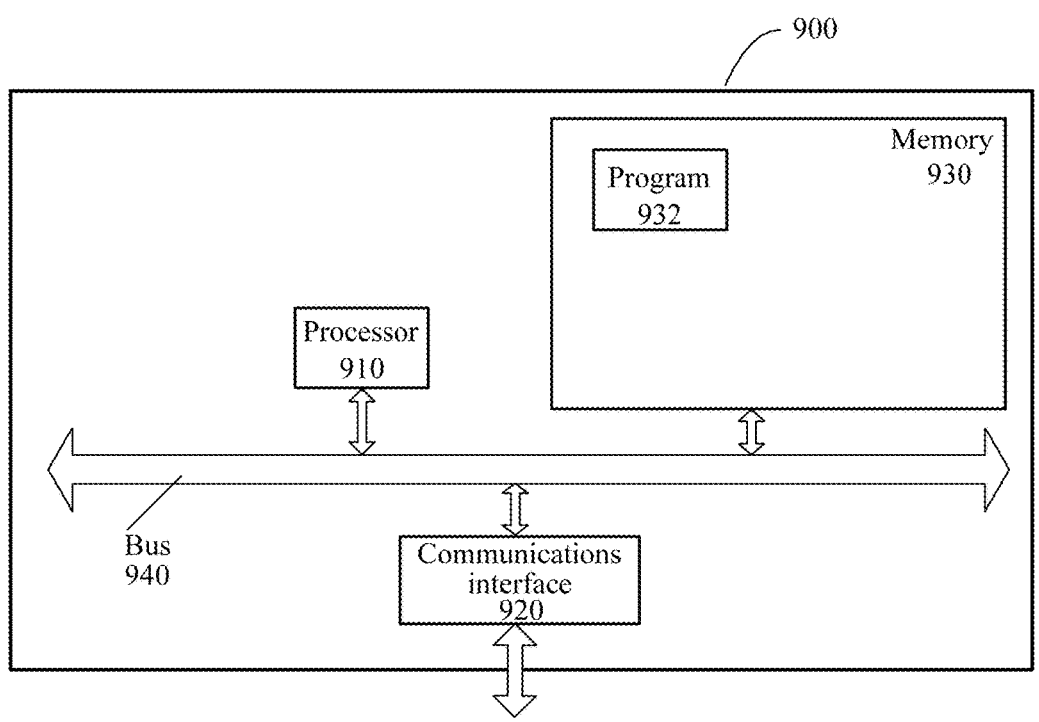
FIG. 9 is another exemplary structural diagram of a spreading control apparatus according to an embodiment of the present application.

FIG. 9 is a schematic structural diagram of another example of a spreading control apparatus according to an embodiment of the present application, and specific embodiments of the present application do not limit specific implementation of the spreading apparatus. As shown in FIG. 9, the spreading control apparatus 900 may comprise:

a processor 910, a communications interface 920, a memory 930, and a communications bus 940.

The processor 910, the communications interface 920, and the memory 930 communicate with each other by using the communications bus 940.

The communications interface 920 is configured to communicate with a network element such as a client.

The processor 910 is configured to execute a program 932, and specifically, may implement relevant steps in the above method embodiments.

Specifically, the program 932 may comprise a program code comprising a computer operation instruction.

The processor 910 may be a central processing unit (CPU), or an application specific integrated circuit (ASIC), or one or more integrated circuits configured to implement the embodiments of the present application.

The memory 930 is configured to store the program 932. The memory 930 may comprise a high-speed random access memory (RAM), or may also comprise a non-volatile memory, for example, at least one magnetic disk memory. The program 932 may be specifically configured to cause the spreading control apparatus 900 to perform the following steps:

generating at least one first information;

generating a combined spreading code codebook at least according to a spreading code codebook; and sending first information associated with spreading by using combined spreading codes, the first information being used for determining at least one first combined spreading code;

wherein the spreading code codebook comprises at least N spreading codes which comprise at least two orthogonal spreading codes, and the N is an integer not less than 2;

the combined spreading code codebook comprises at least M first combined spreading codes comprising N spreading codes, at most one of spreading codes in corresponding positions of any two of the at least M first combined spreading codes is the same, and the M is an integer not less than 2; and the first combined spreading code is used for spreading N data units which comprise at least one first unit and at least one second unit, the at least one first unit comprises data to be sent, and the at least one second unit is configured to recover the at least one first unit.

For specific implementation of the steps in the program 932, reference may be made to corresponding description in the corresponding steps and units in the embodiments, and no further details are provided herein again. Those skilled in the art may clearly know that, for the purpose of convenient and brief description, for a detailed working process of the foregoing device and modules, reference may be made to a corresponding process in the foregoing method embodiments, and no further details are provided herein again.

Those skilled in the art may clearly know that, for the purpose of convenient and brief description, for a detailed working process of the foregoing device and modules, reference may be made to a corresponding process in the foregoing apparatus embodiments, and no further details are provided herein again.

Although the subject matter described herein is provided in a general context executed in combination with an operating system and applications on a computer system, those skilled in the art may realize that other implementations may also be executed in combination with other types of program modules. Generally, the program modules comprise routines, programs, components, data structures and other types of structures executing particular tasks or implement particular abstract data types. Those skilled in the art can understand that the subject matter described herein may be practiced with other computer system configurations, comprising handheld devices, multiprocessor systems, microprocessor-based or programmable consumer electronic products, minicomputers, mainframe computers, etc., and may also be used in a distributed computing environment in which tasks are executed by remote processing devices connected via a communication network. In the distributed computing environment, the program modules may be located in both local and remote memory storage devices.

Those of ordinary skill in the art may be aware that, in combination with the examples described in the embodiments disclosed herein, units and method steps may be implemented by electronic hardware, or a combination of computer software and electronic hardware. Whether the functions are performed by hardware or software depends on particular applications and design constraint conditions of the technical solutions. Those skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or some of the steps of the methods described in the embodiments of the present application. The foregoing computer-readable storage medium comprises physical volatile and non-volatile, removable and non-removable media implemented in any manner or technology of storing information such as computer-readable instructions, data structures, program modules or other data. The computer-readable storage medium specifically comprises, but is not limited to, a USB disk, a mobile hard disk, a read-only memory (ROM), a random access memory (RAM), an erasable programmable read-only memory (EPROM), an electrically erasable programmable read-only memory (EE-PROM), a flash memory or another solid state memory technology, a CD-ROM, a digital versatile disk (DVD), an HD-DVD, a Blue-Ray or other optical storage devices, magnetic tape, magnetic disk storage or other magnetic storage devices, or any other media that can be used to store required information and can be accessed by a computer.

The foregoing implementation manners are merely used for describing the present application, rather than limiting the present application. Those of ordinary skill in the art may made various changes and modifications without departing from the spirit and scope of the present application, and therefore, all equivalent technical solutions shall belong to the scope of the present application, and the protection scope of the present application shall be subject to the claims.

What is claimed is:

1. A spreading method, comprising:
   determining a first combined spreading code to be used at least according to first information associated with spreading by using combined spreading codes, the first combined spreading code comprising N spreading codes, and N being an integer not less than 2; and
   spreading N data units by using the first combined spreading code, wherein the N data units comprise at least one first unit and at least one second unit, the at least one first unit comprises data to be sent, and the at least one second unit is configured to recover the at least one first unit;
   wherein the first combined spreading code is determined at least according to a spreading code codebook, the spreading code codebook comprises at least N spreading codes which comprise at least two orthogonal spreading codes and form at least M first combined spreading codes, at most one of spreading codes in corresponding positions of any two of the at least M first combined spreading codes is the same, and M is an integer not less than 2;
   wherein the first information comprises a control instruction of using combined spreading codes to conduct spreading; and
   wherein determining the first combined spreading code to be used comprises determining the first combined spreading code in response to receipt of the control instruction, wherein the control instruction is sent by a receiving end device in response to that a number of users in a system needing to use orthogonal spreading codes to conduct spreading is over a number of available orthogonal spreading codes of the system.

2. The method of claim 1, wherein the first information comprises: the first combined spreading code.

3. The method of claim 1, wherein the first information comprises: index information corresponding to N spreading codes corresponding to the N data units; and
   the determining a first combined spreading code to be used comprises:
   at least according to the index information, determining the first combined spreading code according to the spreading code codebook.

4. The method of claim 1, further comprising
   acquiring second information associated with the spreading code codebook.

5. The method of claim 1, wherein the determining a first combined spreading code to be used comprises:
   generating a combined spreading code codebook at least according to the first information; and
   determining the first combined spreading code at least according to the combined spreading code codebook.

6. The method of claim 1, wherein the N data units comprise at least one first unit and a second unit, and the second unit is a function of data comprised in the at least one first unit.

7. The method of claim 1, wherein the M is an integer not less than the number of orthogonal spreading codes available to a system.

8. The method of claim 1, further comprising:
   sending data spread at least with the first combined spreading code by at least taking a predetermined data transmission unit as the unit;
   wherein the predetermined data transmission unit comprises N data units.

9. The method of claim 5, wherein the first information comprises: third information for indicating the N.

10. The method of claim 5, further comprising:
    sending fourth information associated with the determined first combined spreading code.

11. A spreading control method, comprising:
    generating a combined spreading code codebook at least according to a spreading code codebook; and sending first information associated with spreading by using combined spreading codes, the first information being used for determining at least one first combined spreading code;

wherein the spreading code codebook comprises at least N spreading codes which comprise at least two orthogonal spreading codes, and the N is an integer not less than 2;

wherein the combined spreading code codebook comprises at least M first combined spreading codes comprising N spreading codes, at most one of spreading codes in corresponding positions of any two of the at least M first combined spreading codes is the same, and the M is an integer not less than 2;

wherein the first combined spreading code is used to conduct spreading N data units which comprise at least one first unit and at least one second unit, the at least one first unit comprises data to be sent, and the at least one second unit is configured to recover the at least one first unit;

wherein the first information comprises a control instruction of using combined spreading codes to conduct spreading; and wherein sending the first information associated with spreading by using the combined spreading codes comprises sending the first information in response to that a number of users in a system needing to use orthogonal spreading codes to conduct spreading is over a number of available orthogonal spreading codes of the system.

12. The method of claim 11, wherein the first information comprises: the first combined spreading code.

13. The method of claim 11, wherein the first information comprises: index information corresponding to N spreading codes corresponding to the N data units.

14. The method of claim 11, further comprising:
sending second information associated with the spreading code codebook.

15. The method of claim 11, wherein the first information comprises: third information for indicating the N.

16. The method of claim 11, further comprising:
receiving at least one predetermined data transmission unit of data spread by using the first combined spreading code; and
recovering the received predetermined data transmission unit of data;
the predetermined data transmission unit comprises the N data units.

17. The method of claim 11, wherein the M is an integer not less than the number of system available orthogonal spreading codes.

18. A non-transitory computer-readable storage medium storing instructions which, when executed by a processor, to cause the processor to perform operations including:
determining a first combined spreading code to be used at least according to first information associated with spreading by using combined spreading codes, the first combined spreading code comprising N spreading codes, and N being an integer not less than 2; and
spreading N data units by using the first combined spreading code, wherein the N data units comprise at least one first unit and at least one second unit, the at least one first unit comprises data to be sent, and the at least one second unit is configured to recover the at least one first unit;
wherein the first combined spreading code is determined at least according to a spreading code codebook, the spreading code codebook comprises at least N spreading codes which comprise at least two orthogonal spreading codes and form at least M first combined spreading codes, at most one of spreading codes in corresponding positions of any two of the at least M first combined spreading codes is the same, and M is an integer not less than 2;
wherein the first information comprises a control instruction of using combined spreading codes to conduct spreading; and
wherein determining the first combined spreading code to be used comprises determining the first combined spreading code in response to receipt of the control instruction, wherein the control instruction is sent by a receiving end device in response to that a number of users in a system needing to use orthogonal spreading codes to conduct spreading is over a number of available orthogonal spreading codes of the system.

19. A spreading apparatus, comprising:
a transceiver;
a memory, configured to store instructions; and
a processor, configured to execute the instructions stored by the memory, the instructions causing the processor to perform operations including:
determining a first combined spreading code to be used at least according to first information associated with spreading by using combined spreading codes, the first combined spreading code comprising N spreading codes, and N being an integer not less than 2; and
spreading N data units by using the first combined spreading code, wherein the N data units comprise at least one first unit and at least one second unit, the at least one first unit comprises data to be sent, and the at least one second unit is configured to recover the at least one first unit;
wherein the first combined spreading code is determined at least according to a spreading code codebook, the spreading code codebook comprises at least N spreading codes which comprise at least two orthogonal spreading codes and form at least M first combined spreading codes, at most one of spreading codes in corresponding positions of any two of the at least M first combined spreading codes is the same, and M is an integer not less than 2;
wherein the first information comprises a control instruction of using combined spreading codes to conduct spreading; and
wherein determining the first combined spreading code to be used comprises determining the first combined spreading code in response to receipt of the control instruction, wherein the control instruction is sent by a receiving end device in response to that a number of users in a system needing to use orthogonal spreading codes to conduct spreading is over a number of available orthogonal spreading codes of the system.

20. The apparatus of claim 19, wherein:
the first information comprises index information corresponding to N spreading codes corresponding to the N data units; and
the operations further include, at least according to the index information, determining the first combined spreading code according to the spreading code codebook.

21. The apparatus of claim 19, wherein the operations further include:
acquiring second information associated with the spreading code codebook.

22. The apparatus of claim 19, wherein the operations further include:
generating a combined spreading code codebook at least according to the first information; and
determining the first combined spreading code at least according to the combined spreading code codebook.

23. The apparatus of claim 19, wherein the operations further include:
sending data spread at least with the first combined spreading code by at least taking a predetermined data transmission unit as the unit;
wherein the predetermined data transmission unit comprises N data units.

24. The apparatus of claim 22, wherein the operations further include
sending fourth information associated with the determined first combined spreading code.

25. A non-transitory computer-readable storage medium storing instructions which, when executed by a processor, to cause the processor to perform operations including:
generating a combined spreading code codebook at least according to a spreading code codebook; and
sending first information associated with spreading by using combined spreading codes, the first information being used for determining at least one first combined spreading code;
wherein the spreading code codebook comprises at least N spreading codes which comprise at least two orthogonal spreading codes, and the N is an integer not less than 2;
wherein the combined spreading code codebook comprises at least M first combined spreading codes comprising N spreading codes, at most one of spreading codes in corresponding positions of any two of the at least M first combined spreading codes is the same, and the M is an integer not less than 2;
wherein the first combined spreading code is used to conduct spreading N data units which comprise at least one first unit and at least one second unit, the at least one first unit comprises data to be sent, and the at least one second unit is configured to recover the at least one first unit;
wherein the first information comprises a control instruction of using combined spreading codes to conduct spreading; and
wherein the first information is sent in response to that a number of users in a system needing to use orthogonal spreading codes to conduct spreading is over a number of available orthogonal spreading codes of the system.

26. A spreading control apparatus, comprising:
a transceiver;
a memory, configured to store instructions; and
a processor, configured to execute the instructions stored by the memory, the instructions causing the processor to perform operations including:
generating a combined spreading code codebook at least according to a spreading code codebook; and
sending first information associated with spreading by using combined spreading codes through the transceiver, the first information being used for determining at least one first combined spreading code;
wherein the spreading code codebook comprises at least N spreading codes which comprise at least two orthogonal spreading codes, and the N is an integer not less than 2;
wherein the combined spreading code codebook comprises at least M first combined spreading codes comprising N spreading codes, at most one of spreading codes in corresponding positions of any two of the at least M first combined spreading codes is the same, and the M is an integer not less than 2;
wherein the first combined spreading code is used to conduct spreading N data units which comprise at least one first unit and at least one second unit, the at least one first unit comprises data to be sent, and the at least one second unit is configured to recover the at least one first unit;
wherein the first information comprises a control instruction of using combined spreading codes to conduct spreading; and
wherein sending the first information associated with spreading by using the combined spreading codes comprises sending the first information in response to that a number of users in a system needing to use orthogonal spreading codes to conduct spreading is over a number of available orthogonal spreading codes of the system.

27. The apparatus of claim 26, wherein the operations further include
sending second information associated with the spreading code codebook.

28. The apparatus of claim 26, wherein the operations further include:
receiving at least one predetermined data transmission unit of data spread by using the first combined spreading code; and
recovering the received predetermined data transmission unit of data;
wherein the predetermined data transmission unit comprises the N data units.

* * * * *

UNITED STATES PATENT AND TRADEMARK OFFICE
CERTIFICATE OF CORRECTION

PATENT NO. : 10,454,558 B2  
APPLICATION NO. : 15/489489  
DATED : October 22, 2019  
INVENTOR(S) : Wang et al.

Page 1 of 1

It is certified that error appears in the above-identified patent and that said Letters Patent is hereby corrected as shown below:

On the Title Page

Item [73], delete "BEIJING ZHIGU TUO TECH CO., LTD." and insert -- BEIJING ZHIGU RUI TUO TECH CO., LTD. --.

Signed and Sealed this  
Twenty-second Day of December, 2020

Andrei Iancu  
*Director of the United States Patent and Trademark Office*